(12) United States Patent
Makimoto et al.

(10) Patent No.: US 8,208,031 B2
(45) Date of Patent: Jun. 26, 2012

(54) IMAGE STABILIZER AND OPTICAL INSTRUMENT THEREWITH

(75) Inventors: Akihiro Makimoto, Kurokawa-gun (JP); Junji Hayashi, Kurokawa-gun (JP); Kentaro Tokiwa, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 370 days.

(21) Appl. No.: 12/647,260

(22) Filed: Dec. 24, 2009

(65) Prior Publication Data

US 2010/0165131 A1 Jul. 1, 2010

(30) Foreign Application Priority Data

Dec. 25, 2008 (JP) .................................. 2008-329217

(51) Int. Cl.
*H04N 5/228* (2006.01)
*H04N 5/225* (2006.01)
(52) U.S. Cl. ...................................... 348/208.7; 348/374
(58) Field of Classification Search ............. 348/208.99, 348/208.4, 208.7, 208.11, 373, 374
See application file for complete search history.

(56) References Cited

U.S. PATENT DOCUMENTS

| | | | | |
|---|---|---|---|---|
| 5,214,513 A * | 5/1993 | Lee | ........................... | 348/207.99 |
| 5,680,251 A | 10/1997 | Kato et al. | | |
| 7,327,952 B2 * | 2/2008 | Enomoto | ........................ | 396/55 |
| 7,502,554 B2 * | 3/2009 | Enomoto | ........................ | 396/55 |
| 7,576,778 B2 | 8/2009 | Hirota et al. | | |
| 8,059,158 B2 * | 11/2011 | Shirono | ...................... | 348/208.7 |
| 2002/0163581 A1 * | 11/2002 | Kitazawa et al. | .......... | 348/208.6 |
| 2006/0017815 A1 | 1/2006 | Stavely et al. | | |
| 2006/0017818 A1 * | 1/2006 | Enomoto | ................... | 348/219.1 |
| 2007/0014555 A1 * | 1/2007 | Hirunuma et al. | ............... | 396/55 |
| 2007/0297055 A1 * | 12/2007 | Enomoto et al. | .............. | 359/554 |
| 2009/0002502 A1 * | 1/2009 | Shirono | ................... | 348/208.99 |
| 2009/0091832 A1 * | 4/2009 | Nagai et al. | .................. | 359/557 |

FOREIGN PATENT DOCUMENTS

JP 2006-030749 A 2/2006
JP 2007-058089 A 3/2007

* cited by examiner

*Primary Examiner* — Nicholas Giles
(74) *Attorney, Agent, or Firm* — Sughrue Mion, PLLC

(57) ABSTRACT

An image stabilizer has a base block, an inner frame for holding a CCD, an outer frame, a pair of horizontal leaf springs, a pair of vertical leaf springs, voice coil motors (VCMs) and a flexible printed circuit (FPC). Upon a shake of a digital still camera due to hand-held shooting, the VCMs shift the inner or outer frame while bending the horizontal or vertical leaf springs so that the CCD is shifted to counteract the camera shake. The FPC connected to the CCD and the VCMs is routed from the inner frame, through the horizontal leaf spring, the outer frame and the vertical leaf spring, and pulled out above the base block. The FPC is glued to the horizontal and vertical leaf springs, and elastically bent together with the horizontal and vertical leaf springs.

16 Claims, 17 Drawing Sheets

FIG. 17
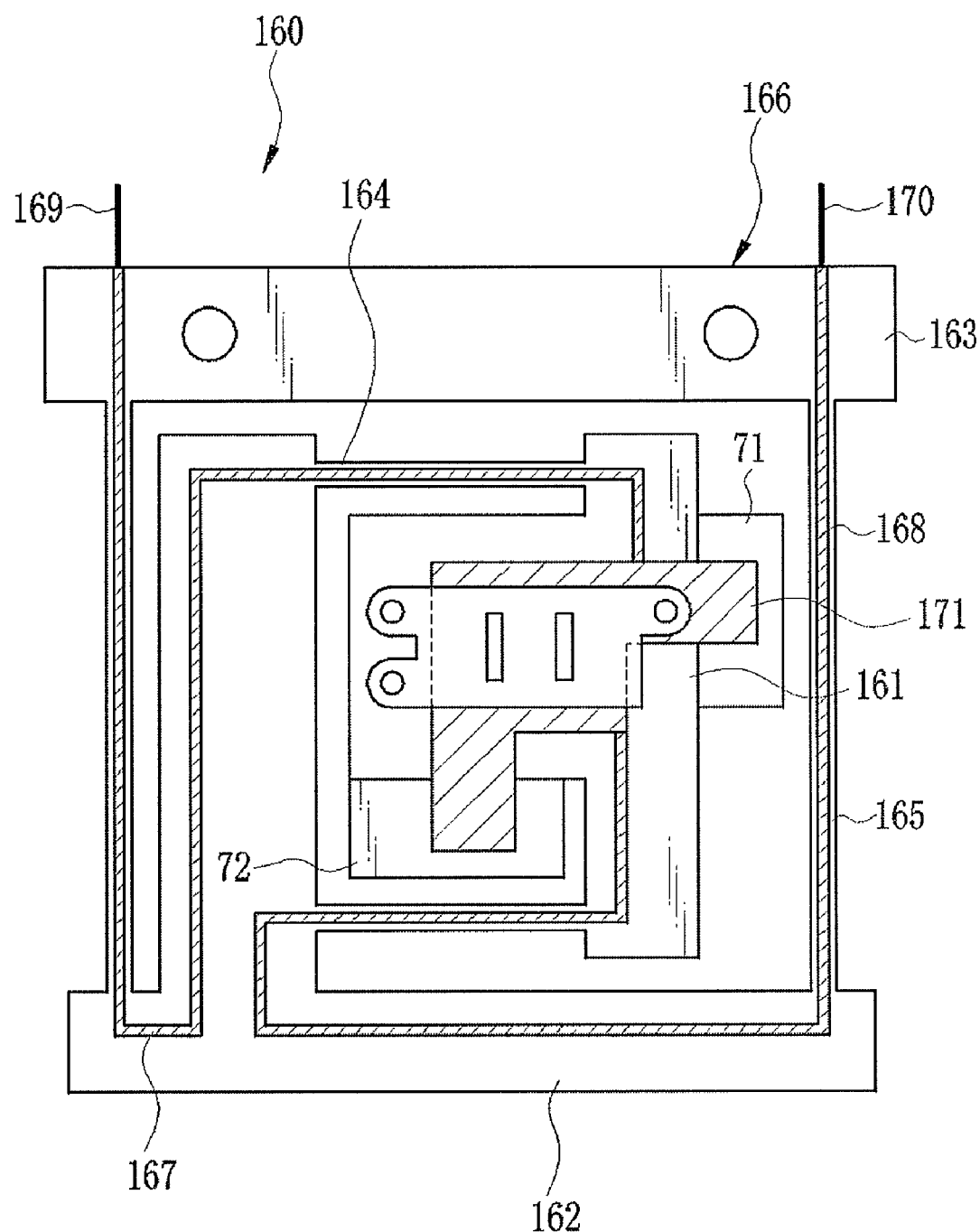
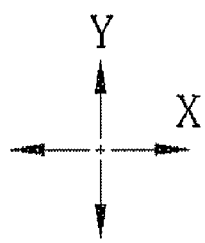

IMAGE STABILIZER AND OPTICAL INSTRUMENT THEREWITH

BACKGROUND OF THE INVENTION

1. Field of the Invention

The present invention relates to an image stabilizer for correcting an image blur due to hand-held shooting, and an optical instrument therewith.

2. Description Related to the Prior Art

Many optical instruments including digital still cameras have an image stabilizer or a shake correction device for correcting an image blur caused by vibration or a camera shake due to hand-held shooting. The image stabilizer is constituted of a shake detector for detecting the camera shake, a holder for movably holding an optical element such as a taking lens or an image sensor, a computing unit, an actuator for shifting the holder in a plane where the optical element is orthogonal to a photography optical axis, and a position detector for detecting the position of the optical element. The computing unit calculates which direction and how much the optical element should be shifted, based on a detection result of the shake detector such as an angular velocity sensor. The actuator e.g. a motor performs feedback control of the shift of the optical element during the camera shake, by using a calculated shift amount as a target value and a detection value of the position detector as a measurement value.

Some image stabilizers use a flexible printed circuit (hereinafter abbreviated as FPC) for connecting the actuator to its control circuit. In KATO et al. (U.S. Pat. No. 5,680,251), for example, a lens barrel incorporates gears and a motor for moving a shake correction lens. An FPC for connecting the motor to a control circuit is disposed in a small space between the gears and an inner wall of the lens barrel. According to SAKAMOTO et al. (Japanese Patent Laid-Open Publication No. 2006-030749), an image stabilizer is provided with a coil being a part of an actuator, and an FPC connects the coil to its control circuit. The FPC is bent in the shape of an arc the center of which coincides with a photography optical axis, so as not to interfere with shift of a shake correction lens.

All of MAEDA et al. (Japanese Patent Laid-Open Publication No. 2007-058089), STAVELY et al. (United States Patent Application Publication No. 2006/0017815) and HIROTA et al. (U.S. Pat. No. 7,576,778) disclose the type of image stabilizer in which an image sensor is shifted in a plane orthogonal to a photography optical axis. According to MAEDA et al., an FPC connected to an image sensor is bent in an arc shape along an outer surface of an image sensor holder to allow shift of the image sensor. In STAVELY et al., an image sensor is mounted on a printed circuit board that is movable along a photography optical axis and in directions orthogonal to the photography optical axis. The printed circuit board is coupled to approximately arc-shaped FPCs. The FPCs allow shift of the printed circuit board in directions orthogonal to the photography optical axis, while preventing rotation of the printed circuit board about the photography optical axis. In HIROTA et al., an FPC for connecting an image sensor to a control circuit board is sagged to allow shift of the image sensor in directions orthogonal to a photography optical axis.

KATO et al. is not applicable to the type of image stabilizer with a shiftable image sensor because the FPC is disposed in the small space in the lens barrel to save space. SAKAMOTO et al., MAEDA et al., STAVELY et al. and HIROTA et al. are applicable to an image stabilizer with a shiftable image sensor because the FPC is sagged, but still have problems caused by the sag of the FPC, that is, reaction force of the sag and variations in bending shape.

The reaction force occurs when an FPC has been bent with shift of an image sensor. Since the reaction force applies a load to an actuator, it is preferable to minimize the reaction force as much as possible. To reduce the reaction force, it is conceivable to elongate a sag. The long sag, however, requires a large storage space. The short sag, on the other hand, causes the large reaction force, and requires a high-power actuator, resulting in increase in size and cost of an image stabilizer.

A sagged shape is formed in an FPC manually or with a jig, and has wide variations in size and shape. Accordingly, it is difficult to precisely estimate the sagged shape of the FPC upon shift of an image sensor. To keep the FPC from contact with another component, an FPC receiving chamber has to have a large margin. This was an impediment to downsizing of a digital still camera.

SUMMARY OF THE INVENTION

A main object of the present invention is to provide a small image stabilizer by eliminating a sag of an FPC.

Another object of the present invention is to provide an optical instrument that contains the image stabilizer in a small space.

An image stabilizer according to the present invention includes a base block fixed to an optical instrument, an inner frame for holding an optical element disposed on an optical axis of the optical instrument, an outer frame disposed outside the inner frame, a pair of first leaf springs disposed in parallel with each other, a pair of second leaf springs disposed in parallel with each other, an actuator, and a flexible printed circuit. Each first leaf spring is fixed to the inner frame at an end and to the outer frame at the other end, and elastically bent in a first direction in a plane orthogonal to the optical axis. Each second leaf spring is fixed to the outer frame at an end and to the base block at the other end, and elastically bent in a second direction transverse to the first direction in the plane orthogonal to the optical axis. The actuator shifts the inner frame or the outer frame while bending the first leaf springs or the second leaf springs, so that the optical element is shifted to counteract a shake in the first direction or the second direction. The flexible printed circuit is disposed along at least one of the first leaf springs and at least one of the second leaf springs. The flexible printed circuit is bent together with the first leaf springs and the second leaf springs.

It is preferable that the optical element be an image sensor, and the flexible printed circuit be connected to the actuator and the image sensor.

The flexible printed circuit may have a first leading section and a second leading section. The first leading section is routed from the inner frame, through one of the first leaf springs, the outer frame and one of the second leaf springs, to the base block. The second leading section is routed from the inner frame, through the other one of the first leaf springs, the outer frame and the other one of the second leaf springs, to the base block.

When the flexible printed circuit is disposed along one of the first leaf springs and one of the second leaf springs, the other one of the first leaf springs without the flexible printed circuit has such a thickness or a width as to have a substantially equal spring constant to the first leaf spring with the flexible printed circuit, and the other one of the second leaf springs without the flexible printed circuit has such a thickness or a width as to have a substantially equal spring constant to the second leaf spring with the flexible printed circuit.

The flexible printed circuit may be provided with a first leaf spring section instead of at least one of the first leaf springs, and a second leaf spring section instead of at least one of the second leaf springs. In the first spring section and the second leaf spring section, it is preferable that an elastic reinforcement be attached to the flexible printed circuit, or the flexible printed circuit be folded for reinforcement.

If the flexible printed circuit has the single first leaf spring section instead of one of the first leaf springs and the single second leaf spring section instead of one of the second leaf springs, the other one of the first leaf springs has such a thickness or a width as to have a substantially equal spring constant to the first leaf spring section, and the other one of the second leaf springs has such a thickness or a width as to have a substantially equal spring constant to the second leaf spring section.

The flexible printed circuit is divided into at least two segments among a first segment disposed on a rear face of the inner frame, a second segment routed from the inner frame through the first leaf spring to the outer frame, a third segment routed from the outer frame through the second leaf spring to the base block and a fourth segment disposed on a top face of the base block. A wiring section provided in at least one of the inner frame, the outer frame and the base block connects the first segment to the second segment, the second segment to the third segment, and the third segment to the fourth segment. It is preferable that the wiring section have a surface wiring, or a flexible printed circuit unit that is insert-molded in the inner frame, the outer frame, or the base block.

An image stabilizer according to the present invention includes an optical element shifter structure, an actuator and a wiring section. The optical element shifter structure integrally includes a base block section fixed to an optical instrument, an inner frame section for holding an optical element disposed on an optical axis of the optical instrument, an outer frame section disposed outside the inner frame section, a pair of first leaf spring sections disposed in parallel with each other and elastically deformable in a first direction in a plane orthogonal to the optical axis, a pair of second leaf spring sections disposed in parallel with each other and elastically deformable in a second direction transverse to the first direction in the plane orthogonal to the optical axis. Each first leaf spring section is fixed to the inner frame section at an end, and to the outer frame section at the other end. Each second leaf spring section is fixed to the outer frame section at an end, and to the base block section at the other end. The actuator is disposed in the inner frame section. The actuator shifts the inner frame section or the outer frame section while bending the first leaf spring sections or the second leaf spring sections, so that the optical element is shifted to counteract a shake in the first direction or the second direction. The wiring section is electrically connected to the actuator. The wiring section is routed from the inner frame section, through at least one of the first leaf spring sections, the outer frame section and at least one of the second leaf spring sections, to the base block section.

The wiring section may have a flexible printed circuit that is insert-molded in the optical element shifter structure. Otherwise, the wiring section may have a surface wiring formed on a surface of the optical element shifter structure.

The present invention can eliminate the harmful effect of a sag of the flexible printed circuit, which a conventional image stabilizer has ever had. More specifically, the present invention obviates a space for containing the sagged flexible printed circuit and eliminates reaction force of the sag, and hence contributes downsizing of the image stabilizer and the optical instrument therewith.

BRIEF DESCRIPTION OF THE DRAWINGS

For more complete understanding of the present invention, and the advantage thereof, reference is now made to the following descriptions taken in conjunction with the accompanying drawings, in which:

FIG. 17 is a rear view of a CCD support mechanism according to an eighth embodiment.

DESCRIPTION OF THE PREFERRED EMBODIMENTS

[First Embodiment]

Figure 1:
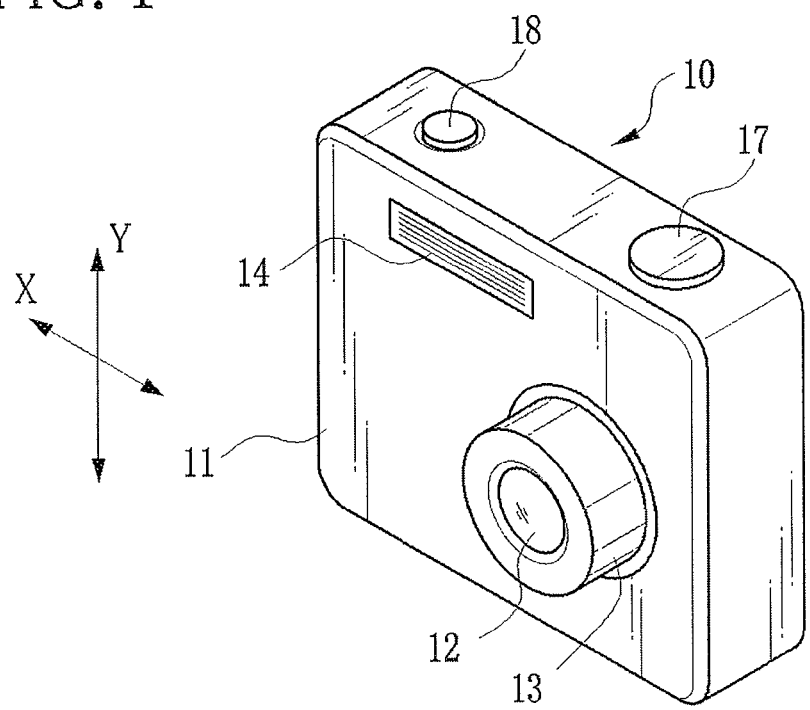
FIG. 1 is a front perspective view of a digital still camera.

As shown in FIG. 1, a digital still camera 10 has a lens barrel 13 for containing an optical system 12, a flashlight emitter 14 for applying flashlight to an object and the like in a front face of a camera body 11.

On a top face of the camera body 11, there are provided an operation dial 17 and a shutter button 18. The operation dial 17 is used for turning the power on and off, and switching an operation mode (among a photographing mode, playback mode and the like). The shutter button 18 is a two-step push switch, and used for taking an image. Upon turning on a first-step switch SW1 by a half press of the shutter button 18, the digital still camera 10 makes preparation for image taking (exposure setting and focusing). After that, when a second-step switch SW2 is turned on by a full press of the shutter button 18, the digital still camera 10 captures a still image and stores image data on a memory card 26.

Figure 2:
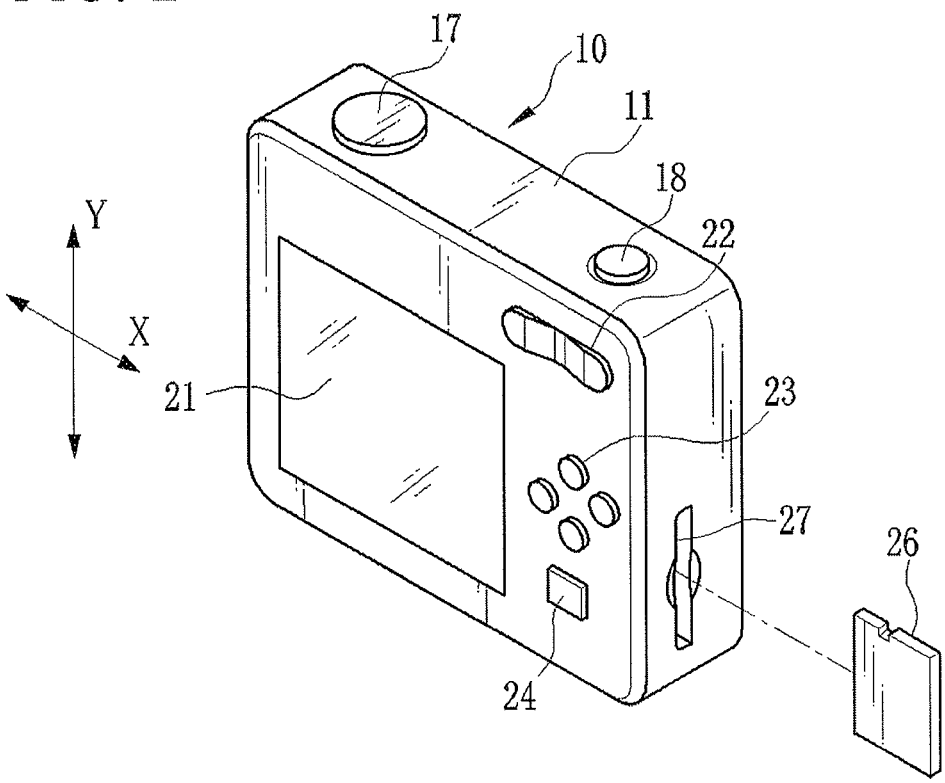
FIG. 2 is a rear perspective view of the digital still camera.

As shown in FIG. 2, a liquid crystal display (LCD) 21, a zoom button 22, a set of cursor keys 23, and a confirmation button 24 are provided on a rear face of the camera body 11.

On the LCD 21, a live image, a playback image, a setting menu screen or the like is displayed in response to the chosen operation mode. The zoom button 22 is used for optically or digitally varying zoom magnification. The cursor keys 23 are used for changing settings, or choosing an item from the setting menu screen on the LCD 21. The confirmation button 24 enters the item chosen by the cursor keys 23.

In a side face of the camera body 11, a memory card slot 27 is provided. The memory card 26 is detachably inserted into the memory card slot 27.

Figure 3:
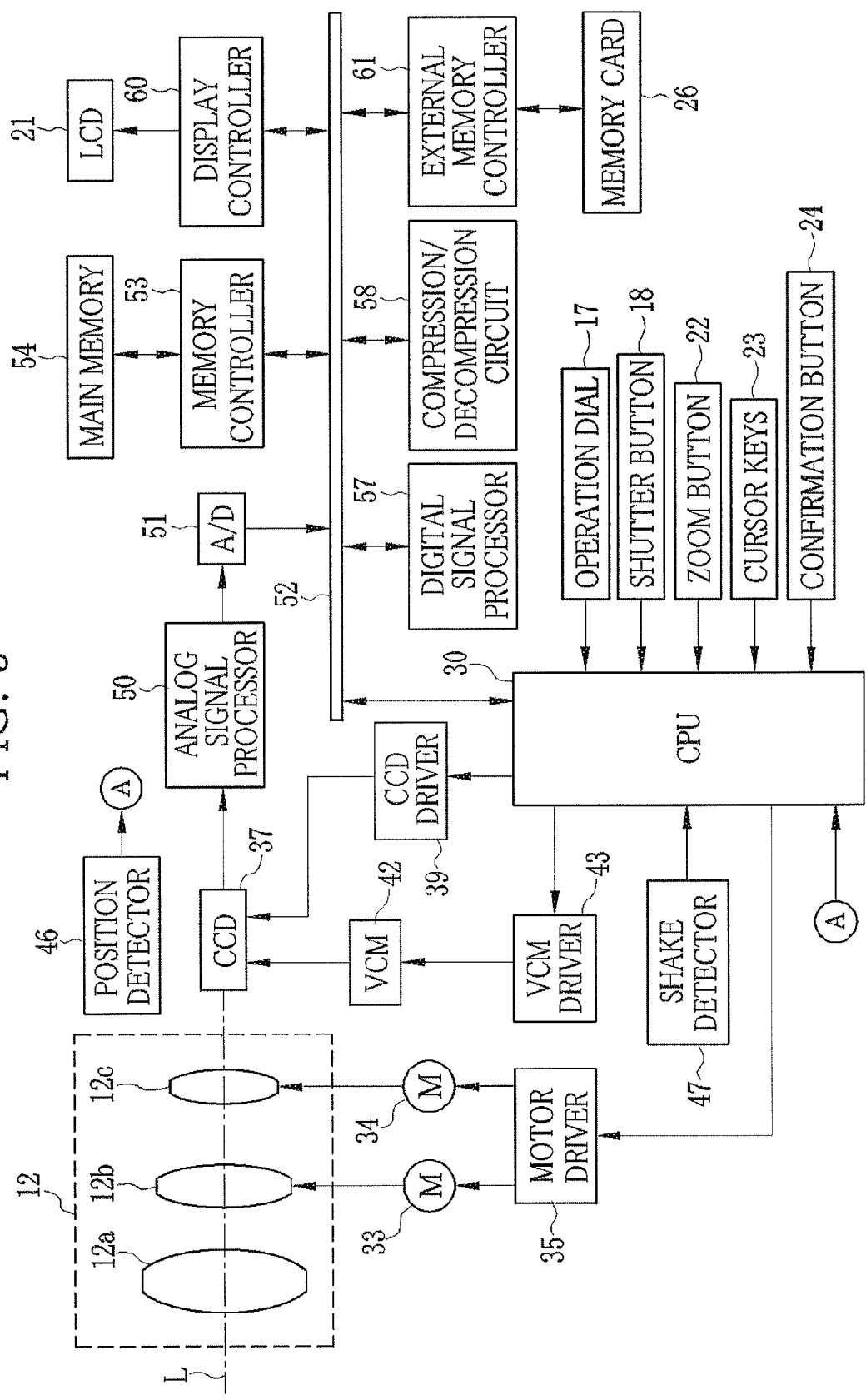
FIG. 3 is a circuit block diagram of the digital still camera.

In FIG. 3, a CPU 30 controls the entire operation of the digital still camera 10. To be more specific, the CPU 30 powers on or off the digital still camera 10, or changes the operation mode thereof in response to rotation of the operation dial 17. The CPU 30 carries out various types of operation in response to a press of the shutter button 18, the cursor keys 23 and the confirmation button 24.

The optical system 12 has a fixed lens group 12a, a zoom lens group 12b, and a focus lens group 12c. The fixed lens group 12a is disposed at the forefront of the lens barrel 13. The zoom lens group 12b and the focus lens group 12c are movably disposed along a photography optical axis "L" of the optical system 12. The zoom lens group 12b is driven by a stepping motor 33, and the focus lens group 12c is driven by a stepping motor 34. The CPU 30 controls the positions of the zoom lens group 12b and focus lens group 12c via a motor driver 35 (zooming and focusing). Each lens group has a single or plurality of lens elements.

Behind the optical system 12, there is disposed a CCD 37 that rests in a standard position where the center of its imaging surface coincides with the photography optical axis "L", while a camera shake does not occur. The CPU 30 controls actuation of the CCD 37 via a CCD driver 39. The CCD 37 converts an object image formed by the optical system 12 into an electrical pickup signal. Instead of the CCD 37, a CMOS image sensor or the like may be used.

The CCD 37 is supported by a CCD support mechanism 64, which will be described later on, movably in a plane orthogonal to the photography optical axis "L" in response to the camera shake. The CCD support mechanism 64 has first and second voice coil motors (VCMs) 42. When an X-axis direction (yaw direction) refers to a horizontal direction of the digital still camera 10 and a Y-axis direction (pitch direction) refers to a vertical direction thereof, the first VCM 42 shifts the CCD 37 in the X-axis direction and the second VCM 42 shifts the CCD 37 in the Y-axis direction. The CPU 30 controls the VCMs 42 via VCM drivers 43.

The CCD support mechanism 64 is provided with a position detector 46 for detecting the position of the CCD 37. Position data of the CCD 37 outputted from the position detector 46 is inputted to the CPU 30. A shake detector 47 has two angular velocity sensors for detecting the X-axis and Y-axis camera shake applied to the digital still camera 10. Shake data from the shake detector 47 is inputted to the CPU 30. Instead of the angular velocity sensors, accelerometers may be used as the shake detector 47.

The CCD support mechanism 64, the VCMs 42, the position detector 46 and the shake detector 47 compose an image stabilizer. In a shake correction mode, the CPU 30 performs feedback control of the VCMs 42 based on the shake data from shake detector 47 and the position data from the position detector 46, and shifts the position of the CCD 37 in response to the camera shake for the purpose of suppressing a blur in the object image that is incident on the imaging surface of the CCD 37. Instead of the CPU 30 performing the feedback control by software, the VCM drivers 43 may be provided with differential amplifiers for the feedback control. Instead of shifting the CCD 37, the CCD 37 may be fixed and the optical system 12 may be shifted in the plane orthogonal to the photography optical axis.

The pickup signal from the CCD 37 is inputted to an analog signal processor 50, and subjected to analog signal processing including gain correction, correlated double sampling and the like. The pickup signal outputted from the analog signal processor 50 is inputted to an A/D converter 51, and converted into a digital signal. The digital pickup signal from the A/D converter 51 is transmitted through a bus 52, and written to a main memory 54 as the image data by a memory controller 53.

The memory controller 53 reads out the image data from the main memory 54 based on a command from the CPU 30 connected to the bus 52. In addition to the A/D converter 51, the memory controller 53 and the CPU 30, a digital signal processor 57, a compression/decompression circuit 58, an external memory controller 61 and a display controller 60 are connected to the bus 52.

The digital signal processor 57 applies predetermined image processing such as YC conversion, gamma correction, contour correction and white balance correction to the image data read from the main memory 54. The compression/decompression circuit 58 applies predetermined compression processing such as JPEG compression to the image data outputted from the digital signal processor 57. The external memory controller 61 writes/reads the image data to/from the memory card 26 loaded in the memory card slot 27. The display controller 60 displays the image data, the setting menu screen or the like on the LCD 21.

In a still image photographing mode, a field image (moving image) is read from the CCD 37 at a predetermined readout rate, and temporarily written to the main memory 54 as image data. The image data in the main memory 54 is subjected to the image processing by the digital signal processor 57, and sent to the display controller 60. Accordingly, a live image or a through image taken by the CCD 37 is displayed on the LCD 21.

After framing a picture while seeing the through image on the LCD 21, the shutter button 18 is half pressed. In response to the half press, an exposure amount (shutter speed and aperture stop value) is determined and focusing of the optical system 12 is automatically obtained. If the shutter button 18 is fully pressed, a still image is taken under the exposure amount. In this still image photography, a frame image is read from the CCD 37, and written to the main memory 54. The image data stored on the main memory 54 is subjected to the image processing by the digital signal processor 57 and to the compression processing by the compression/decompression circuit 58. The image data of the still image after the compression processing is written to the memory card 26 by the external memory controller 61. After taking the still image, another through image is displayed on the LCD 21 as a preparation for taking the next still image.

If the digital still camera 10 is put into the playback mode, the image data is read out from the memory card 26, and subjected to decompression processing by the compression/decompression circuit 58. The decompressed image data is sent to the display controller 60, so that the playback still image is displayed on the LCD 21. Operation of frame advance buttons forward or backward changes the still image displayed on the LCD 21 frame-by-frame. By zooming operation, a part of the still image is displayed under magnification. If the digital still camera 10 is put into a moving image photographing mode, a moving image is taken for a lapse of predetermined time in response to the operation of the shutter button 18, and moving image data is stored on the memory card 26.

Figure 4:
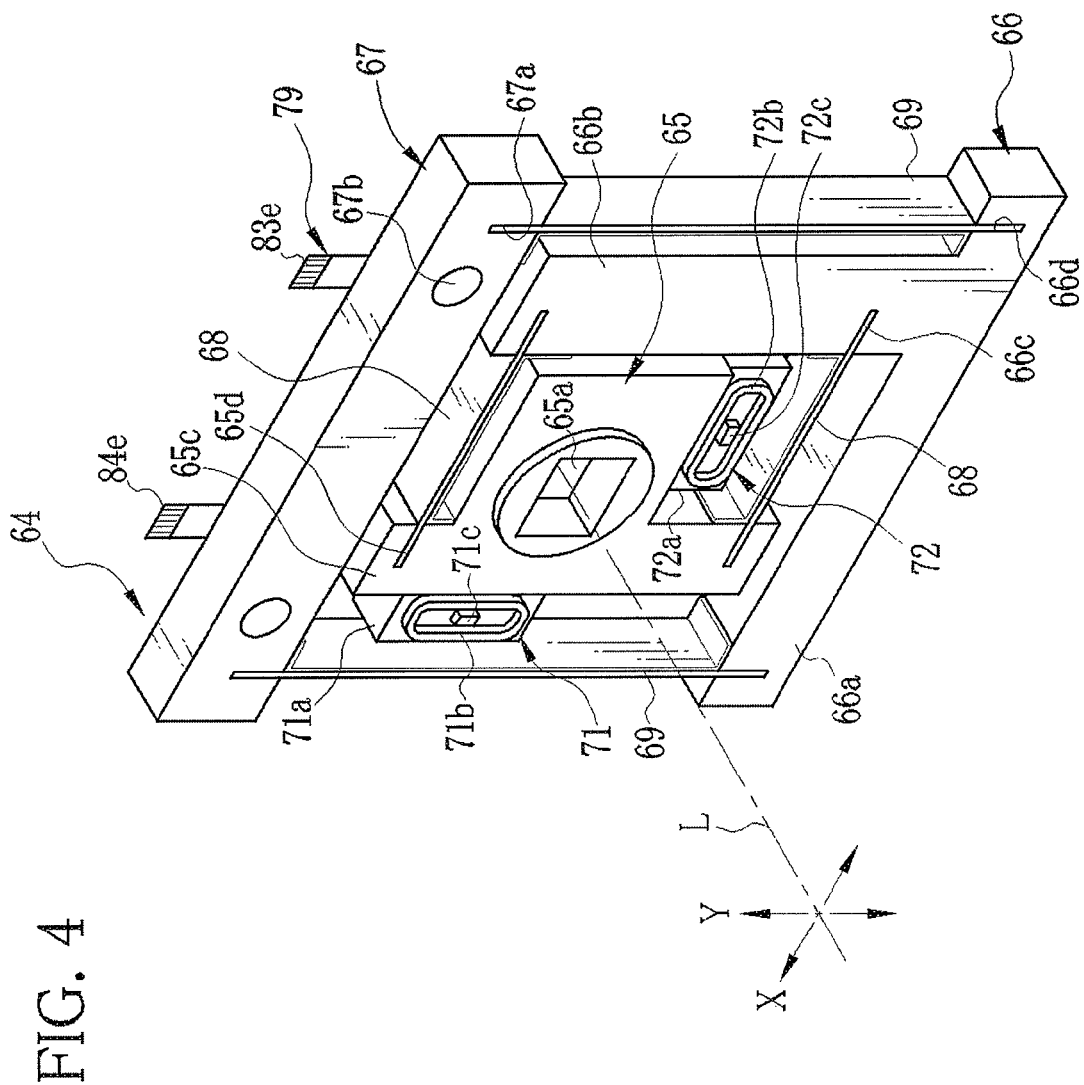
FIG. 4 is a front perspective view of a CCD support mechanism according to a first embodiment.
Figure 5:
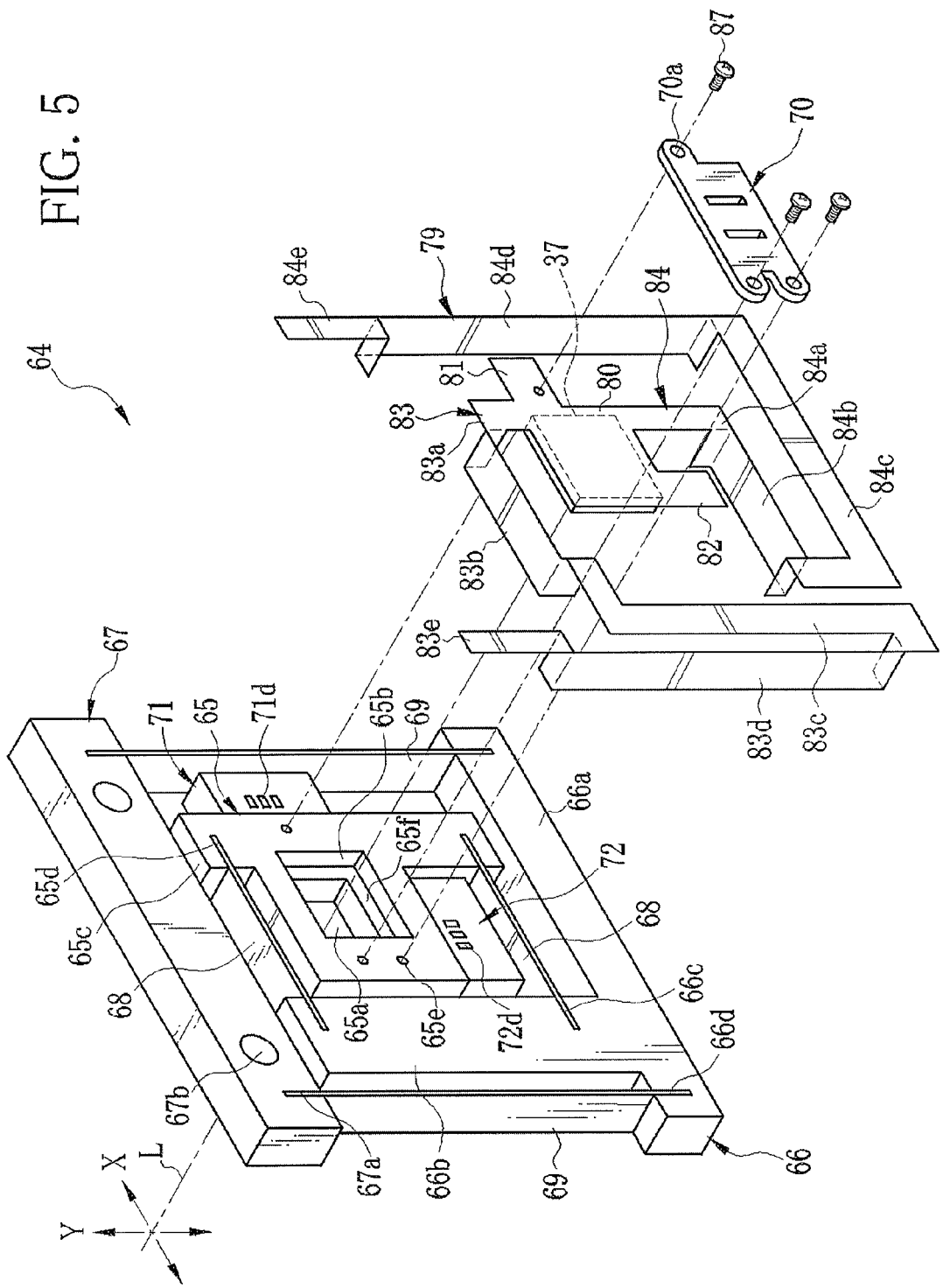
FIG. 5 is an exploded rear perspective view of the CCD support mechanism.

As shown in FIGS. 4 and 5, the CCD support mechanism 64 is constituted of an inner frame 65, an outer frame 66, a base block 67, a pair of horizontal leaf springs 68 disposed in parallel with each other along the X-axis direction, a pair of vertical leaf springs 69 disposed in parallel with each other along the Y-axis direction, a flexible printed circuit (FPC) 79, and a retainer 70. A first coil unit 71 is attached to a side face of the inner frame 65, and a second coil unit 72 is attached to a bottom face thereof.

The inner frame 65 holds the CCD 37, and is movable in the plane orthogonal to the photography optical axis "L". The inner frame 65 is made of plastic into a plate shape, and has a rectangular exposure opening 65a in its front face. In a rear face of the inner frame 65, a hollow section 65b is formed so as to be coupled to the exposure opening 65a. The CCD 37 is fitted into the hollow section 65b.

Prismatic leaf spring receiving sections 65c project along the Y-axis from top and bottom faces of the inner frame 65. In a side face of each leaf spring receiving section 65c, a slit 65d is formed along the X-axis. One end of the horizontal leaf spring 68 is tightly fitted into the slit 65d.

The outer frame 66 is made of plastic into a plate shape. The approximately L-shaped outer frame 66 has a horizontal section 66a extending in the X-axis direction and an erected section 66b erected in the Y-axis direction. Slits 66c are formed in the erected section 66b at positions facing the slits 65d of the inner frame 65. Into the slit 66c, the other end of each horizontal leaf spring 68 is fitted along the X-axis. Slits 66d are formed in both ends of the horizontal section 66a, and an end of each vertical leaf spring 69 is fitted into the slit 66d along the Y-axis.

The base block 67 is made of plastic into a prismatic shape, and is disposed horizontally in the camera body 11. Two slits 67a are formed in a bottom face of the base block 67 at positions facing the slits 66d of the outer frame 66, and the other end of each vertical leaf spring 69 is inserted into the slit 67a along the Y-axis. The base block 67 has two attachment holes 67b that penetrate in a front-back direction. The base block 67 is screwed to the camera body 11 or the lens barrel 13 through the attachment holes 67b.

The horizontal leaf springs 68 are, for example, approximately rectangular metal leaf springs. The horizontal leaf springs 68 are identical to each other, and disposed in parallel with each other in the camera body 11. One end of each horizontal leaf spring 68 is fixedly inserted into the slit 65d of the inner frame 65. The other end of the horizontal leaf spring 68 is fixedly inserted into the slit 66c of the outer frame 66.

The pair of horizontal leaf springs 68 is bent in the Y-axis direction in the plane orthogonal to the photography optical axis "L", while a second printed coil 72b is energized to shift the inner frame 65 in the Y-axis direction for correction of the camera shake. The horizontal leaf springs 68 are processed with high precision so that an amount of distortion in the direction of the photography optical axis "L" is of the order of micrometers.

The vertical leaf springs 69 are rectangular metal leaf springs that are longer than the horizontal leaf springs 68. The vertical leaf springs 69 are identical to each other, and disposed in parallel with each other. One end of each vertical leaf spring 69 is fixedly inserted into the slit 66d of the outer frame 66, and the other end thereof is fixedly inserted into the slit 67a of the base block 67.

The pair of vertical leaf springs 69 is bent in the X-axis direction in the plane orthogonal to the photography optical axis "L", while a first printed coil 71b is energized to shift the outer frame 66 in the X-axis direction for correction of the camera shake. The vertical leaf springs 69 are processed with high precision so that an amount of distortion in the direction of the photography optical axis "L" is of the order of micrometers.

Figure 6A:
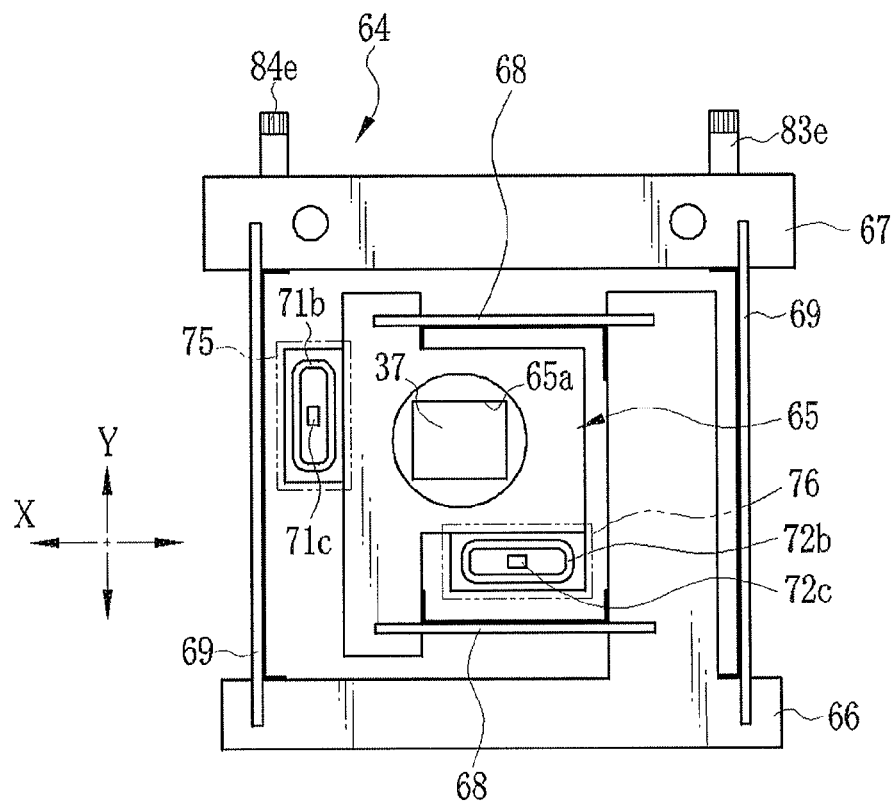
FIG. 6A is a front view of the CCD support mechanism before camera shake.

The first coil unit 71 is constituted of a first attachment plate 71a attached to the side face of the inner frame 65, the loop-shaped first printed coil 71b attached on a front face of the first attachment plate 71a, and a first Hall element 71c positioned at the center of the first printed coil 71b. In a like manner, the second coil unit 72 is constituted of a second attachment plate 72a attached to the bottom face of the inner frame 65, the loop-shaped second printed coil 72b attached on a front face of the second attachment plate 72a, and a second Hall element 72c positioned at the center of the second printed coil 72b. As shown in FIG. 6A, a first stationary magnet 75 is disposed so as to face the first printed coil 71b. A second stationary magnet 76 is disposed so as to face the second printed coil 72b. The first printed coil 71b and the first stationary magnet 75 compose the X-axis VCM 42 for shifting the CCD 37 in the X-axis direction, and the second printed coil 72b and the second stationary magnet 76 compose the Y-axis VCM 42 for shifting the CCD 37 in the Y-axis direction.

The X-axis and Y-axis VCMs 42 are of well-known flat-coil type. The first stationary magnet 75 generates a magnetic field around the first printed coil 71b, and the second stationary magnet 76 generates a magnetic field around the second printed coil 72b.

When the X-axis VCM driver 43 feeds an electric current through the first printed coil 71b in the magnetic field of the first stationary magnet 75, a Lorentz force is generated in the X-axis direction. When the Y-axis VCM driver 43 feeds an electric current through the second printed coil 72b in the magnetic field of the second stationary magnet 76, in a like manner, a Lorentz force is generated in the Y-axis direction. The directions of generated Lorentz forces depend on the directions of the electric currents flowing through first and second printed coils 71b and 72b, and the magnitude of the Lorentz forces depends on current values.

The Lorentz force generated by the second printed coil 72b shifts the inner frame 65 in the Y-axis direction while bending the horizontal leaf springs 68. Likewise, the Lorentz force generated by the first printed coil 71b shifts the inner frame and the outer frame 66 in the X-axis direction while bending the vertical leaf springs 69.

Figure 6B:
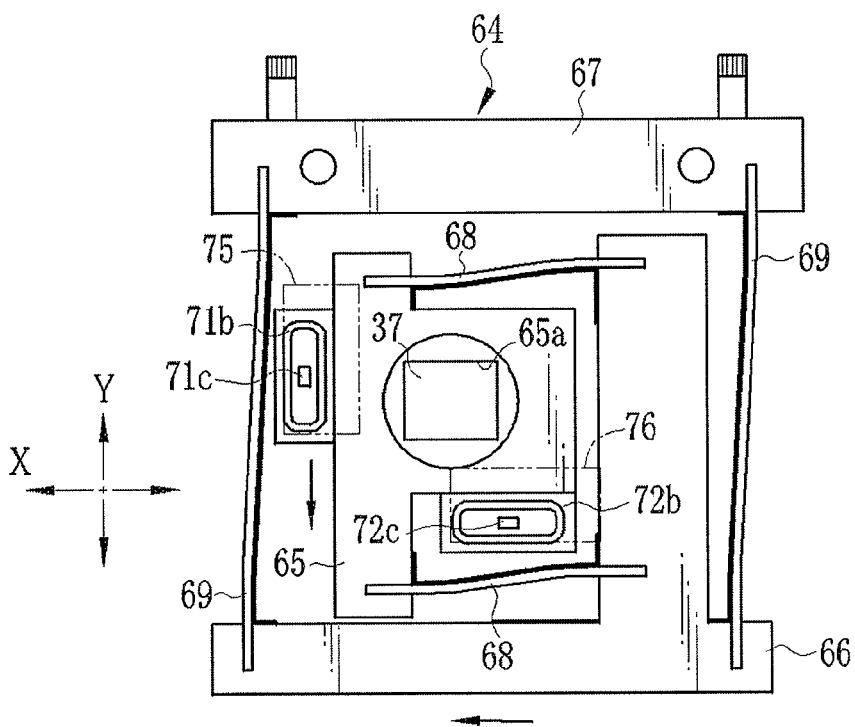
FIG. 6B is a front view of the CCD support mechanism after the camera shake.

The first Hall element 71c, the second Hall element 72c, the first stationary magnet 75 and the second stationary magnet 76 compose the position detector 46. The first Hall element 71c outputs a detection signal in accordance with magnetic field strength of the first stationary magnet 75. The second Hall element 72c outputs a detection signal in accordance with magnetic field strength of the second stationary magnet 76. As shown in FIG. 6B, when the inner frame 65 is shifted in the negative Y-axis direction to counteract the camera shake, the second Hall element 72c detects variation in the magnetic field strength of the second stationary magnet 76. Thus, it is possible to calculate the position of the CCD 37 in the Y-axis direction relative to the standard position. In a like manner, when the outer frame 66 is shifted in the positive X-axis direction, the first Hall element 71c detects variation in the magnetic field strength of the first stationary magnet 75, so that the position of the CCD 37 in the X-axis direction can be calculated.

As shown in FIG. 5, the CCD 37 is fitted into the hollow section 65b from the side of the imaging surface. To a rear face of the CCD 37, there is attached a flexible printed circuit (FPC) 79 for electrically connecting the CCD 37 to a main circuit board having the CPU 30, the CCD driver 39, the VCM drivers 43 and the like. The FPC 79 has a CCD connection section 80 connected to the CCD 37, a first coil unit connection section 81 connected to the attachment plate 71a of the first coil unit 71, a second coil unit connection section 82 connected to the attachment plate 72a of the second coil unit 72, and a first leading section 83 and a second leading section 84 that are pulled out of the CCD connection section 80 dividedly in two directions.

Figure 7:
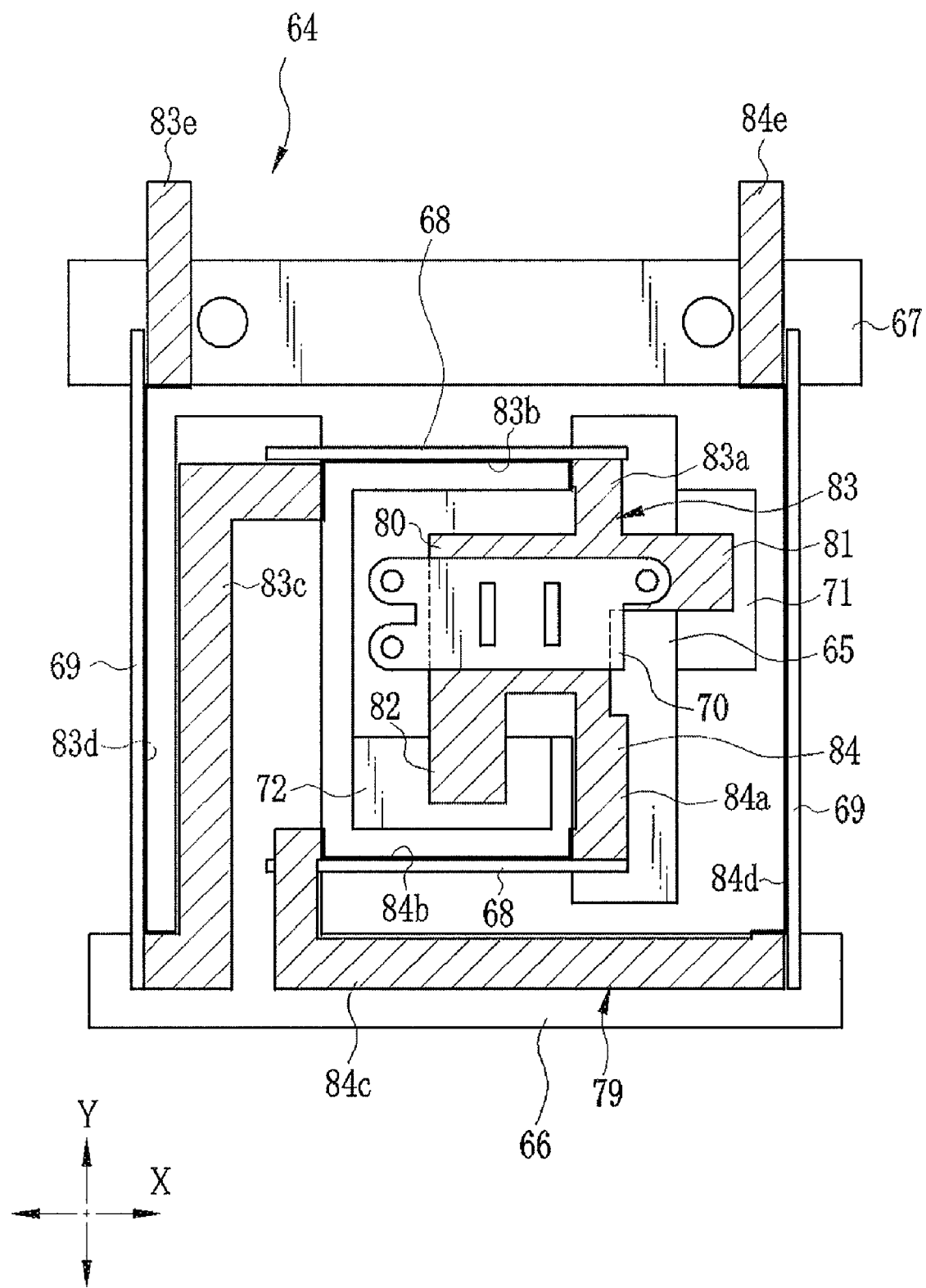
FIG. 7 is a rear view of the CCD support mechanism.

As shown in FIGS. 5 and 7, the first leading section 83 has an inner frame fitting part 83a, a horizontal leaf spring fitting part 83b, an outer frame fitting part 83c, a vertical leaf spring fitting part 83d and a terminal part 83e, and individual parts are divided by fold lines. The fitting parts 83a to 83d are fitted on the rear face of the inner frame 65, a bottom face of the upper horizontal leaf spring 68, a rear face of the erected section 66b of the outer frame 66, and a side face of the vertical leaf spring 69 on the negative side of the X-axis, respectively, and reach the base block 67. The terminal part 83e upwardly protrudes from the base block 67, and used for connection to the main circuit board.

The second leading section 84, as with the first leading section 83, has an inner frame fitting part 84a, a horizontal leaf spring fitting part 84b, an outer frame fitting part 84c, a vertical leaf spring fitting part 84d, and a terminal part 84e. The fitting parts 84a to 84d are fitted on the rear face of the inner frame 65, a top face of the lower horizontal leaf spring 68, a rear face of the horizontal section 66a of the outer frame 66, and a side face of the vertical leaf spring 69 on the positive side of the X-axis, respectively, and reach the base block 67.

The first leading section 83 and the second leading section 84 are adhered to the corresponding components of the CCD support mechanism 64 by a double-faced adhesive tape or the like. Accordingly, the horizontal leaf spring fitting part 83b of the first leading section 83 and the horizontal leaf spring fitting part 84b of the second leading section 84 are elastically bent together with the pair of horizontal leaf springs 68. In a like manner, the vertical leaf spring fitting parts 83d and 84d are elastically bent together with the pair of vertical leaf springs 69, so that the FPC 79 does not have sagging.

The retainer 70 is fastened to the inner frame 65 with screws 87 through three holes 70a formed on the corners of the retainer 70 and screw holes 65e of the inner frame 65. The retainer 70 presses the front face of the CCD 37 from behind through the FPC 79 against a positioning surface 65f of the hollow section 65b.

Figure 8:
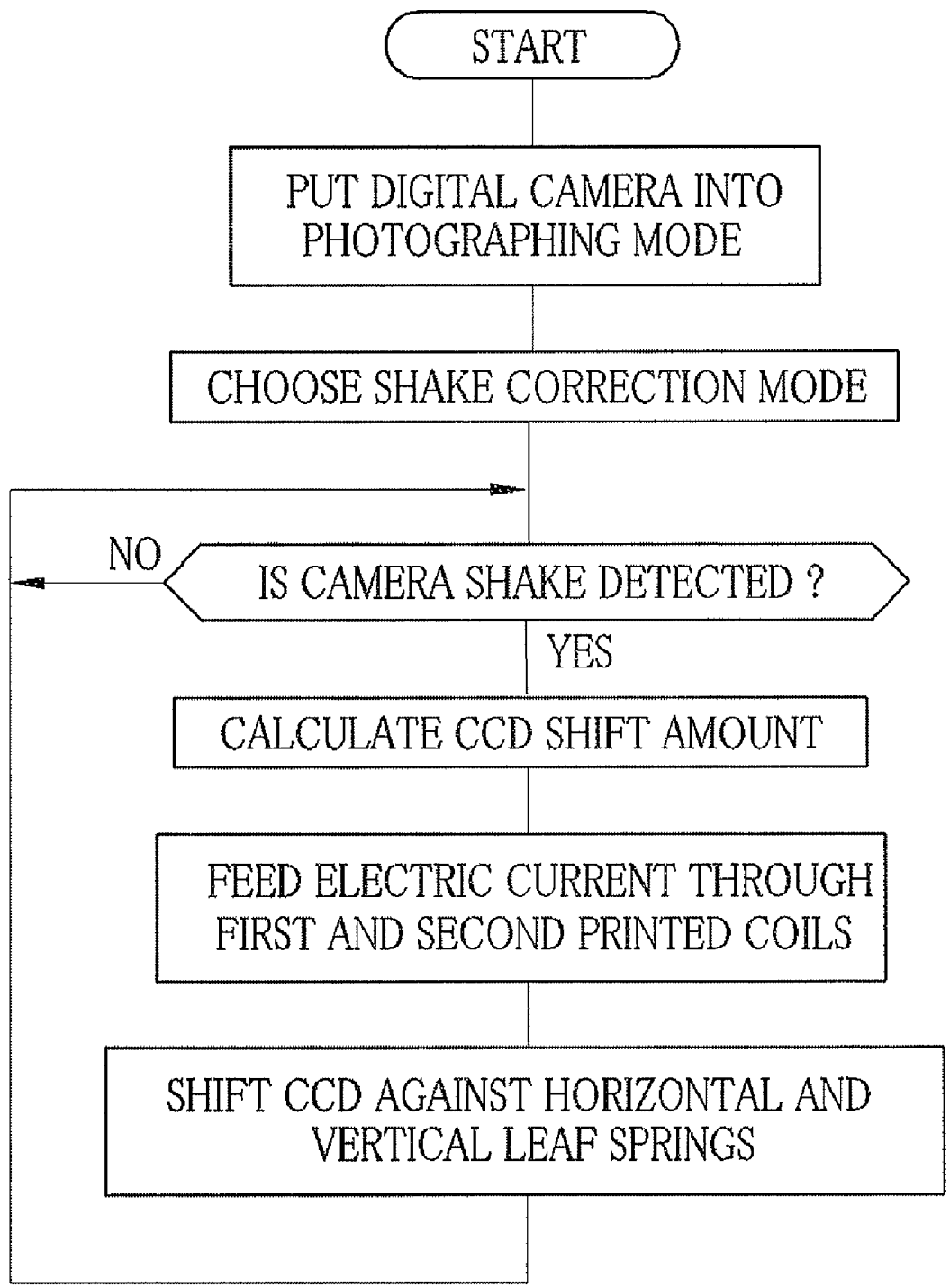
FIG. 8 is a flowchart of a shake correction mode.

Referring to FIG. 8, the operation of the foregoing embodiment will be described. To take a still image, the digital still camera 10 is put into the photographing mode by operation of the operation dial 17. To prevent an image blur by hand-held shooting, the shake correction mode is also chosen. The shake correction mode is not selectable in the playback mode.

While the camera shake does not occur, the horizontal leaf springs 68 and the vertical leaf springs 69 are straight as shown in FIG. 6A. In this case, the CCD 37 held by the inner frame 65 is maintained in the standard position where the center of the CCD 37 is aligned with the photography optical axis "L".

Upon occurrence of the camera shake, the shake detector 47 attached to the lens barrel 13 or the camera body 11 is quickly actuated. The shake detector 47 outputs detection signals (X-axis angular velocity and Y-axis angular velocity) that represent magnitude of the camera shake in the X-axis (yaw) and Y-axis (pitch) directions, and sends the detection signals to the CPU 30. The CPU 30 calculates target shift amounts of the CCD in each of the X-axis and Y-axis directions, based on integration values of individual angular velocities. These target shift amounts are sent to the VCM drivers 43.

The X-axis VCM driver 43 has an X-axis differential amplifier, and the Y-axis VCM driver 43 has a Y-axis differential amplifier. Each differential amplifier performs feedback control of the position of the CCD 37, by using the target shift amount as a target value and a present position as a measurement value. The X-axis present position is detected by the first Hall element 71c, and the Y-axis present position is detected by the second Hall element 72c.

In response to occurrence of the camera shake, the target shift amounts are calculated in accordance with the X-axis and Y-axis angular velocities. Since the CCD 37 is in the standard position at this point, the VCM drivers 43 feed large amounts of electric currents through the printed coils 71b and 72b at the beginning of the camera shake, to generate the large Lorentz forces between the printed coil 71b and the stationary magnet 75 and between the printed coil 72b and the stationary magnet 76. The Lorentz forces, as shown in FIG. 6B, shift the inner frame in the opposite direction of the camera shake, while elastically bending the horizontal leaf springs 68 and the vertical leaf springs 69. The shift of the inner frame 65 brings a change in the present position of the CCD 37. Thus, the difference between the target shift amounts and the present position becomes smaller, so that the electric currents flowing through the printed coils 71b and 72b are reduced. The shift of the inner frame 65 counteracts a shift of an image formed on the CCD 37 due to the camera shake, and hence a sharp still image without a blur is captured.

When the horizontal leaf springs 68 are bent in the Y-axis direction, the inner frame 65 is slightly shifted in the X-axis direction too, but the X-axis shift amount is of the order of micrometers. Accordingly, there is no harm in energizing only the second printed coil 72b in response to the Y-axis camera shake. Likewise, when the vertical leaf springs 69 are bent in the X-axis direction, the outer frame 66 is slightly shifted in the Y-axis direction too, but the Y-axis shift amount is negligible. Accordingly, in response to the X-axis camera shake, only the first printed coil 71b is energized to correct the image blur.

Upon stopping the camera shake, the target shift amount becomes "0", and hence the VCM drivers 43 feed electric currents of opposite directions through the printed coils 71b and 72b to return the CCD 37 to the standard position. At this time, the elasticity of the horizontal leaf springs 68 and the vertical leaf springs 69 contribute to the CCD return. When the CCD 37 has returned to the standard position, the target shift amounts and present position become "0", and thus the VCM drivers 43 stop energizing the printed coils 71b and 72b. Then, the CCD 37 is maintained in the standard position by the horizontal leaf springs 68 and the vertical leaf springs 69.

The camera shake tends to occur during a press of the release button 18 in a state of holding the digital still camera 10 with hands. The image stabilizer shifts the CCD 37 while detecting the camera shake so as not to move the image on the CCD 37, and allows capturing the sharp still image without the image blur.

In the CCD support mechanism 64 according to the present invention, since the CCD 37 is held by only the pairs of horizontal leaf springs 68 and vertical leaf springs 69, there is no problem of friction or wobble during the shift of the CCD 37. Thus, it is possible to provide the image stabilizer with high followability to the VCMs 42. The pairs of horizontal leaf springs 68 and vertical leaf springs 69 that are flexible in the plane orthogonal to the photography optical axis "L" obviate the need for a slider and guide shafts, and hence contribute reduction in the thickness of the digital still camera 10 in the direction of the photography optical axis "L".

Since the FPC 79 adhering to the horizontal and vertical leaf springs 68 and 69 is elastically bent together with the leaf springs 68 and 69 in accordance with the shift of the inner frame 65 or the outer frame 66, a large reaction force does not occur. Thus, the low-power VCMs 42 can adequately shift the CCD 37. Furthermore, obviating a space for containing a sag of the FPC 79 contributes downsizing of the digital still camera 10.

[Second Embodiment]

In the first embodiment, the FPC 79 is bifurcated into the first leading section 83 and the second leading section 84, and the first and second leading sections 83 and 84 are fitted on all of the pair of horizontal leaf springs 68 and the pair of vertical leaf springs 69. In a second embodiment, an FPC is fitted on one of the horizontal leaf springs 68 and one of the vertical leaf springs 69. The same reference numbers as the first embodiment indicate substantially the same elements or parts, and description thereof will be omitted.

Figure 9:
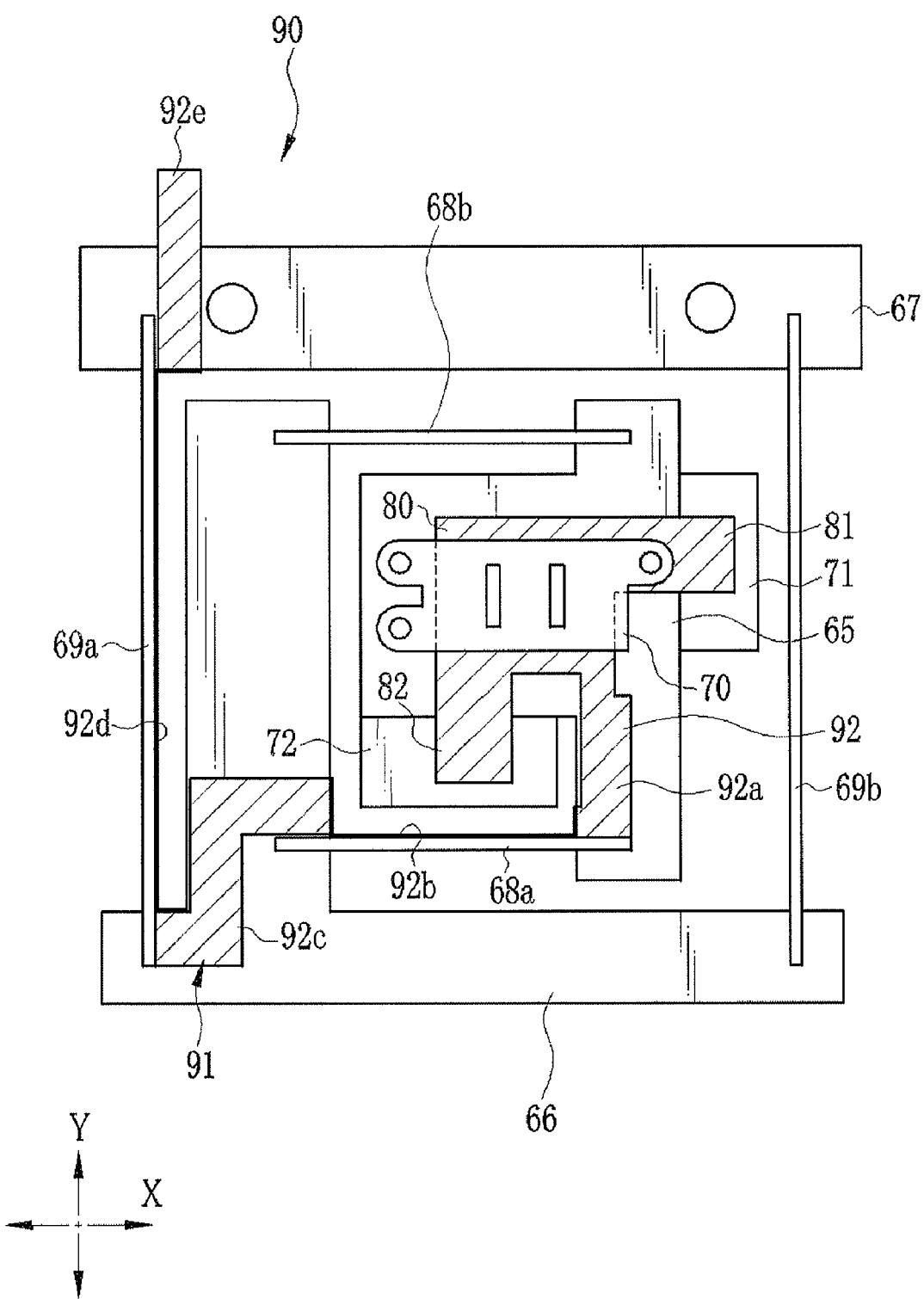
FIG. 9 is a rear view of a CCD support mechanism according to a second embodiment.

An FPC 91 of a CCD support mechanism 90, as shown in FIG. 9, has a leading section 92 that extends downwardly from the CCD connection section 80. The leading section 92 has an inner frame fitting part 92a, a horizontal leaf spring fitting part 92b, an outer frame fitting part 92c, a vertical leaf spring fitting part 92d and a terminal part 92e, and individual parts are divided by fold lines. The fitting parts 92a to 92d are fitted on the rear face of the inner frame 65, the top face of the lower horizontal leaf spring 68a, the rear face of the outer frame 66, and the side face of the vertical leaf spring 69a on the negative X-axis side, respectively, and reach the base block 67. The terminal part 92e upwardly protrudes from the base block 67, and used for connection to the main circuit board. As with the first embodiment, each part of the FPC 92 is adhered to the corresponding component by the double-faced adhesive tape or the like.

If the flexural rigidity of the FPC 91 is sufficiently smaller than those of the first and second leaf springs, the horizontal leaf springs 68a and 69a could be identical to each other, and the vertical leaf springs 69a and 69b could be identical to each other. If the flexural rigidity of the FPC 91 is so large as to have effect on the flexural rigidity of each leaf spring, it is necessary to substantially equalize a spring constant between the horizontal leaf spring 68a with the FPC 91 and the horizontal leaf spring 68b without the FPC 91 and between the vertical leaf spring 69a with the FPC 91 and the vertical leaf spring 69b without the FPC 91.

The spring constant of the leaf spring 68b or 69b without the FPC 91 is calculated by the following mathematical expression (1):

$$K=Ebh^3 \div 4(L/2)^3 \qquad \text{expression (1)}$$

wherein, "K" represents the spring constant, "E" represents the Young's modulus, "b" represents the thickness of the leaf spring, "h" represents the width thereof, and "L" represents the length thereof. The spring constant of the leaf spring 68a or 69a with the FPC 91 varies with a fixing position and other conditions of the FPC 91, so it is preferable to obtain an appropriate value by experiment. The FPC 91 of the second embodiment is smaller than the FPC 79 of the first embodiment, and hence contributes cost reduction.

[Third Embodiment]

The FPC 79 of the first embodiment may be reinforced to act as the pair of horizontal leaf springs 68 and the pair of vertical leaf springs 69. A third embodiment in which an FPC is used as the leaf springs will be hereinafter described. The same reference numbers as the first and first embodiments indicate substantially the same elements or parts, and description thereof will be omitted.

Figure 10:
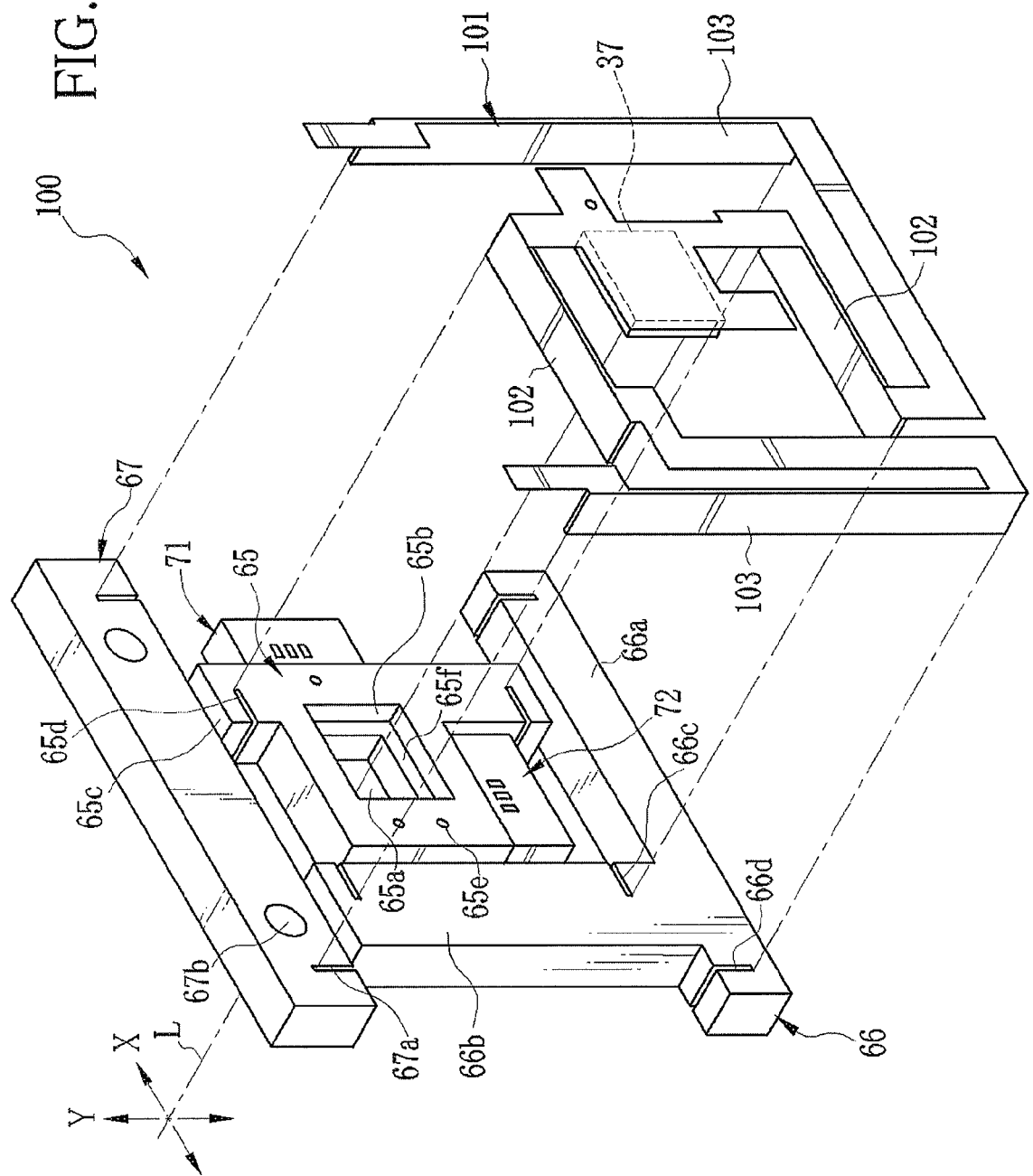
FIG. 10 is an exploded rear perspective view of a CCD support mechanism according to a third embodiment.

In a CCD support mechanism 100 shown in FIG. 10, the inner frame 65, the outer frame 66 and the base block 67 are identical to those of the first embodiment. An FPC 101 has almost the same shape as the FPC 79 of the first embodiment. The FPC 101 is provided with a pair of horizontal leaf spring sections 102 corresponding to the horizontal leaf spring fitting parts 83b and 84b of the FPC 79, and a pair of vertical leaf spring sections 103 corresponding to the vertical leaf spring fitting parts 83d and 84d. Both ends of each horizontal leaf spring section 102 are fitted into the slits 65d and 66c. Both ends of each vertical leaf spring section 103 are fitted into the slits 66d and 67a. The pairs of horizontal leaf spring sections 102 and vertical leaf spring sections 103 function as leaf springs.

Figure 11:
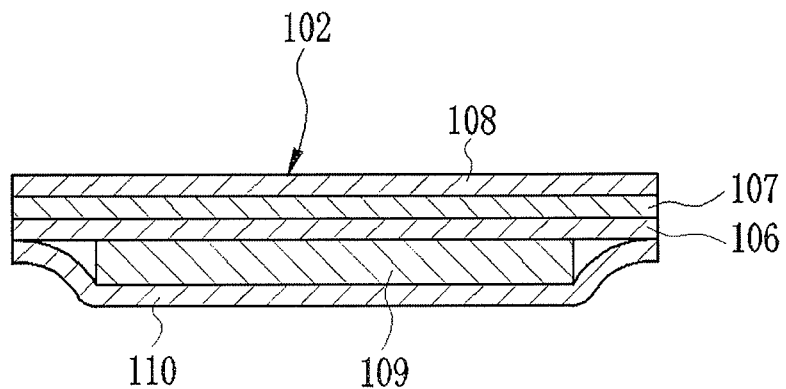
FIG. 11 is a sectional view of a first leaf spring section according to the third embodiment.

As shown in FIG. 11, the horizontal leaf spring section 102 is constituted of a base film 106 composing the FPC 101, a copper foil 107, and a top cover film 108. A metal reinforcing plate 109 is disposed under the base film 106, and a bottom cover film 110 covers the reinforcing plate 109 from beneath. The vertical leaf spring section 103 has the same structure. According to the third embodiment, eliminating the leaf springs 68 and 69 of the first embodiment can bring about cost reduction and ease of assembly.

[Fourth Embodiment]

Figure 12A:
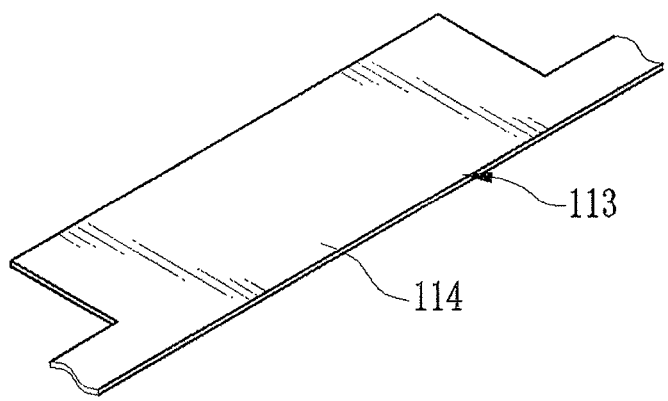
FIG. 12A is a perspective view of a first leaf spring section before folded according to a fourth embodiment.
Figure 12B:
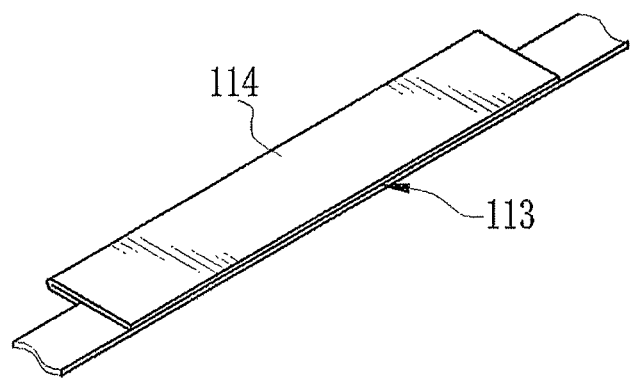
FIG. 12B is a perspective view of the first leaf spring section after folded.

In a fourth embodiment shown in FIG. 12A, an FPC 113 has a wide leaf spring section 114 to be folded as shown in FIG. 12B for reinforcement. The folded section is integrally glued by the double-faced adhesive tape or an adhesive, to further improve stiffness.

Only widening the leaf spring section 114 can increase the stiffness. However, the wide leaf spring section 114 may cause increase in the size of the CCD support mechanism in the direction of the photography optical axis "L", because the leaf spring section 114 has to be considerably widened to support the inner frame 65 and the like depending on the stiffness of the FPC 113. Accordingly, this method can efficiently increase the stiffness. The number of folding is not limited to once, but may be a plurality of times. Leaving the folded section of the FPC 113 without a pattern brings about ease of folding operation, and consequently reduces variations in a folded shape.

[Fifth Embodiment]

Figure 13:
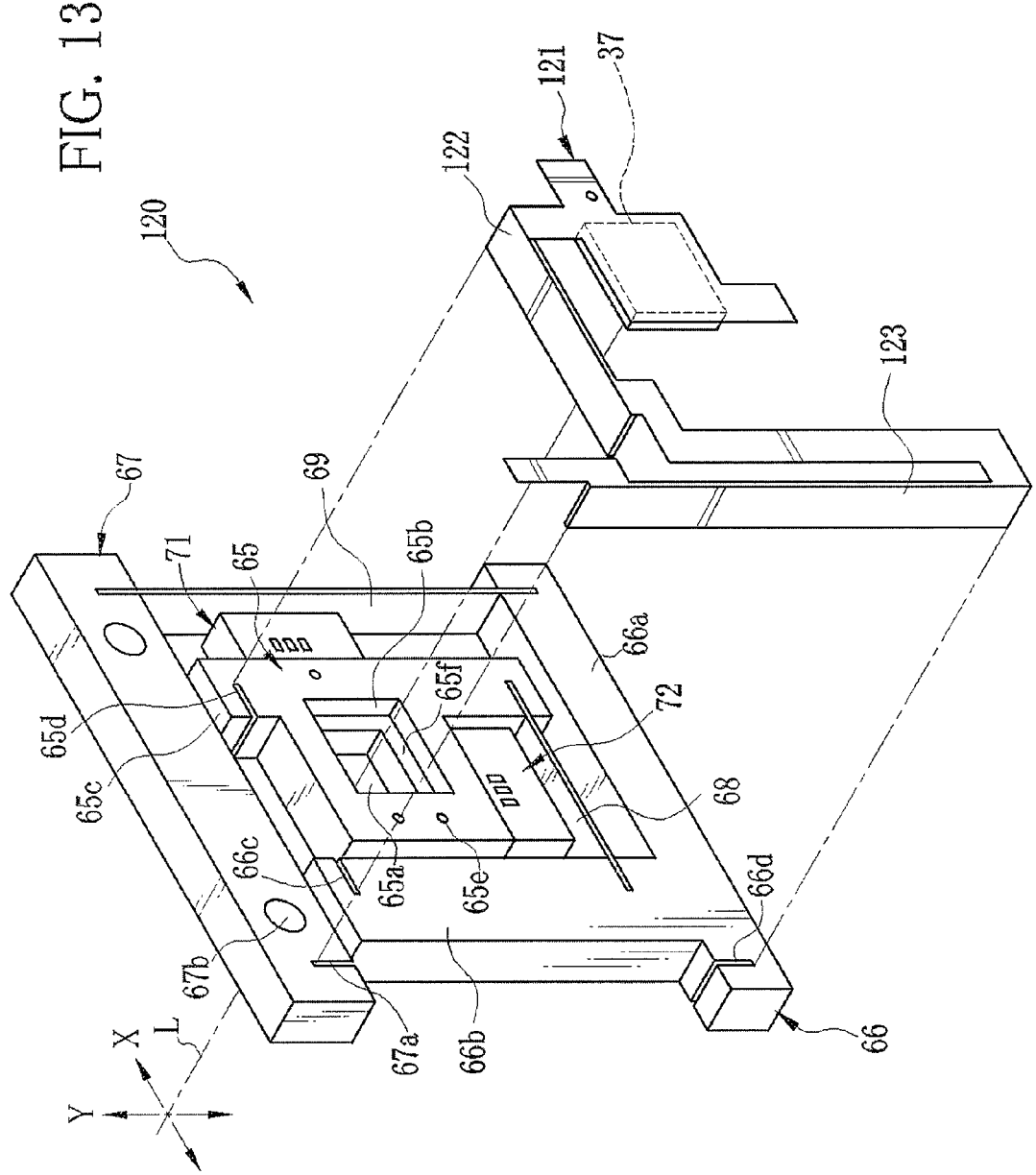
FIG. 13 is an exploded rear perspective view of a CCD support mechanism according to a fifth embodiment.

In a CCD support mechanism 120 according to a fifth embodiment, as shown in FIG. 13, there are the horizontal leaf spring 68 and the vertical leaf spring 69 on the lower and positive X-axis sides, and an FPC 121 is provided with a horizontal leaf spring section 122 and a vertical leaf spring section 123 on the upper and negative X-axis sides, respectively. The horizontal and vertical leaf spring sections 122 and 123 may have the same structure as the horizontal vertical leaf spring sections 102 and 103 according to the third embodiment, or as the leaf spring section 114 according to the fourth embodiment.

To equalize a spring constant between the horizontal leaf spring section 122 and the horizontal leaf spring 68 and between the vertical leaf spring section 123 and the vertical leaf spring 69, it is preferable to adjust the thicknesses and widths of the leaf springs 68 and 69 or the leaf spring sections 122 and 123. According to the fifth embodiment, the number of components is reduced as compared with the CCD support mechanism 90 of the second embodiment.

[Sixth Embodiment]

Figure 14:
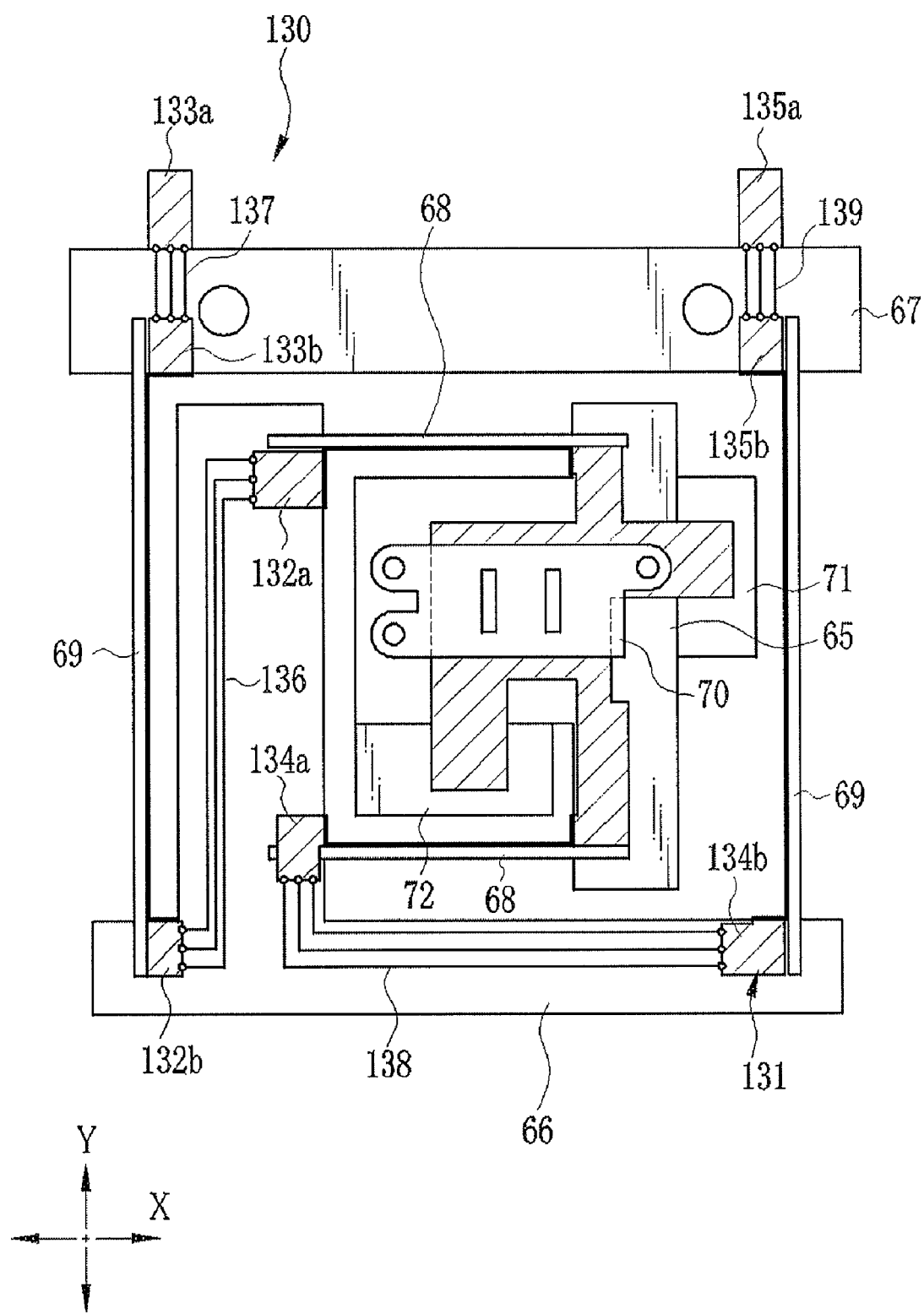
FIG. 14 is a rear view of a CCD support mechanism according to a sixth embodiment.

In a CCD support mechanism 130 according to a sixth embodiment, as shown in FIG. 14, each outer frame fitting part of an FPC 131 is divided in two segments 132a and 132b, or 134a and 134b. Each terminal part is divided in two segments 133a and 133b, or 135a and 135b. The divided two segments are connected by surface wiring 136 to 139 formed on the rear face of the outer frame 66 and the base block 67.

According to this embodiment, dividing the FPC 131 into a plurality of small segments can ease attachment operation, in comparison with attachment of the long FPC. To insulate the surface wiring 136 to 139 from around, insulating sheets may be glued on the surface wiring 136 to 139. The FPCs according to the second to fifth embodiments may be divided into small segments, and surface wiring connects the segments in a like manner.

[Seventh Embodiment]

Figure 15:
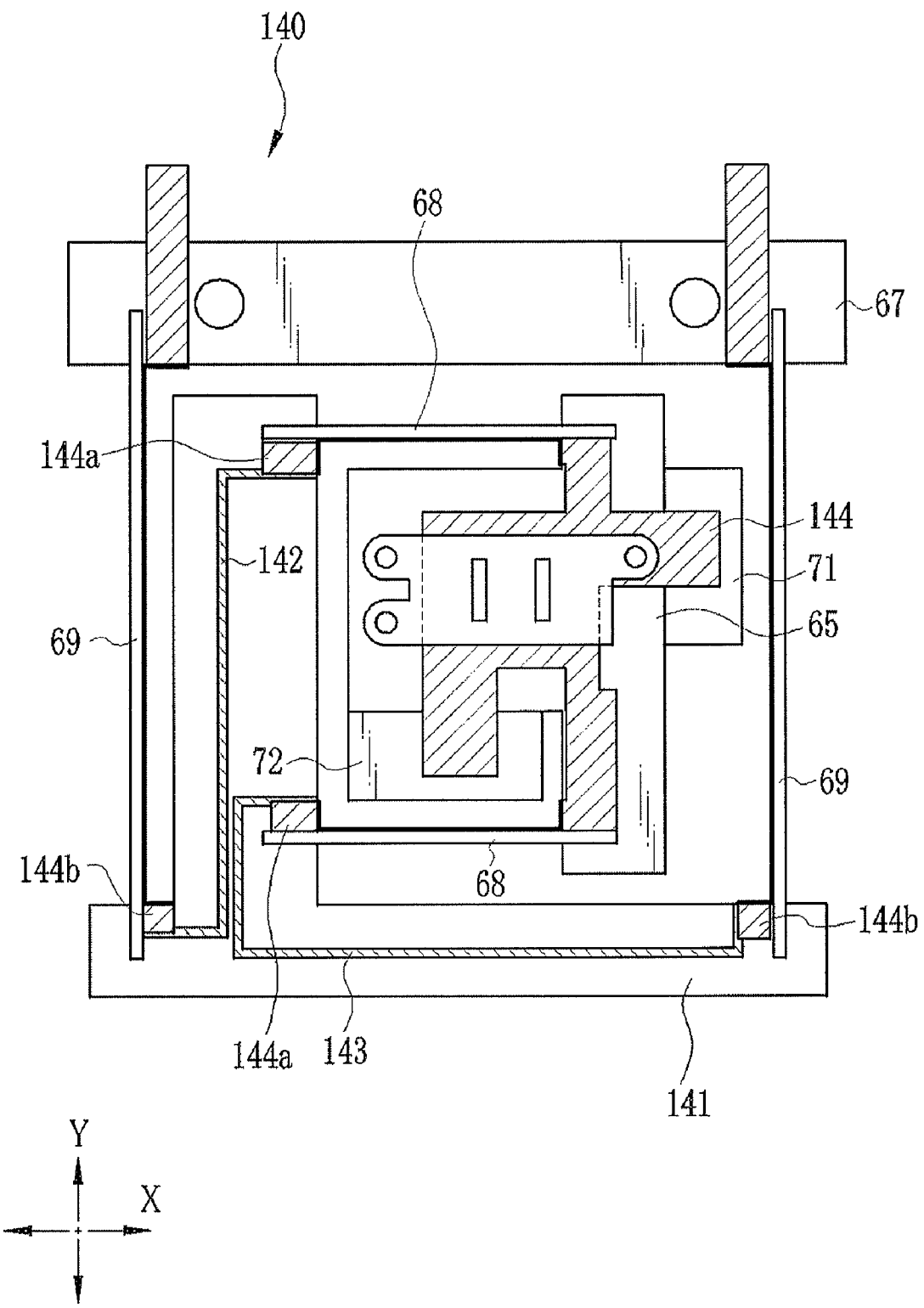
FIG. 15 is a rear view of a CCD support mechanism according to a seventh embodiment.
Figure 16:
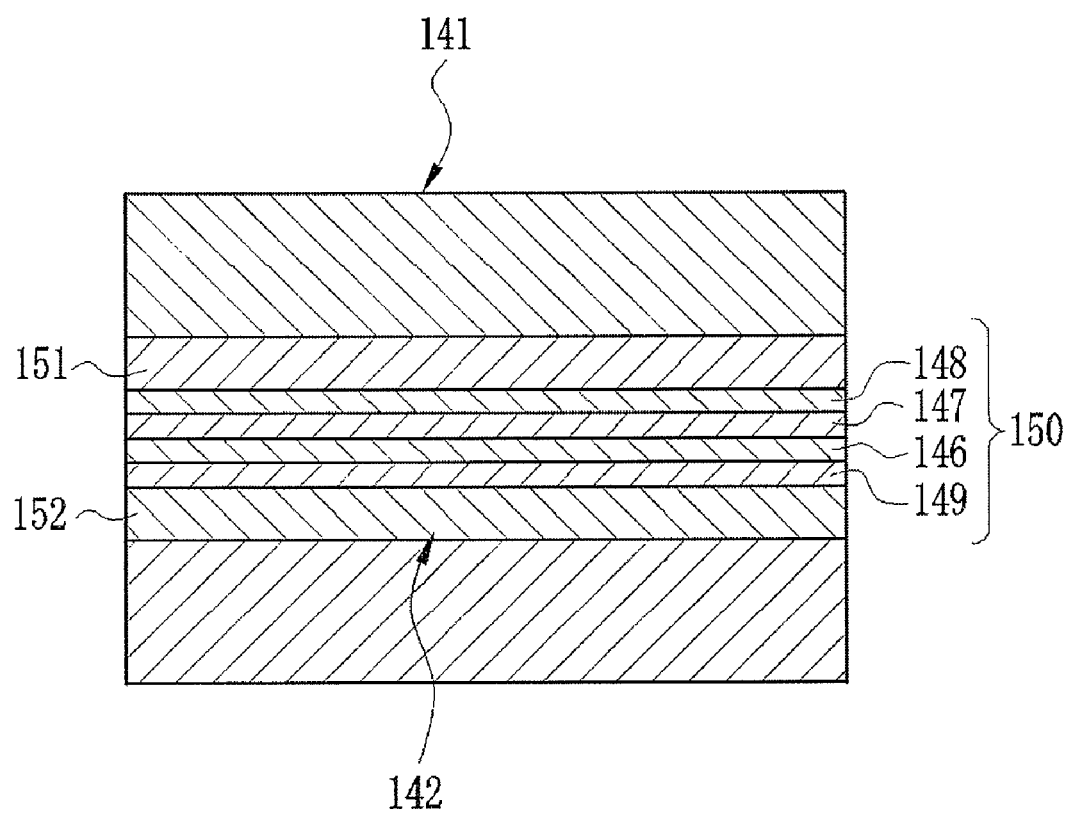
FIG. 16 is a sectional view of an outer frame according to the seventh embodiment.

In a CCD support mechanism 140 according to a seventh embodiment, as shown in FIG. 15, FPC units 142 and 143 are insert-molded in an outer frame 141 instead of the surface wiring 136 to 139 of the sixth embodiment. Each FPC unit 142 or 143 connects a segment 144a, which is routed from the inner frame 65 through the horizontal leaf spring 68 to the outer frame 141, to a segment 144b, which is routed from the outer frame 141 through the vertical leaf spring 69 to the base block 67. As shown in FIG. 16, the FPC unit 142 is constituted of an FPC 150 and two sheet metals 151 and 152. The FPC 150 has a base film 146, a copper foil 147 and cover films 148 and 149. The two sheet metals 151 and 152 sandwich the FPC 150 from above and below. The FPC unit 143 has the same structure.

According to the seventh embodiment, it is possible to ensure the layout of wiring on the outer frame 141 by its design. Unlike the CCD support mechanism 130 according to the sixth embodiment, there is no need for gluing the insulating sheets. Since the FPC units 142 and 143, in which the FPC 150 is sandwiched between the sheet metals 151 and 152, are insert-molded in the outer frame 141, it is possible to prevent melting of the cover films 148 and 149, deformation of the FPC 150 and the like by molding heat. The FPC units 142 and 143 are easily attachable to a mold of the outer frame 141. The cover films 148 and 149 are generally made of polyamide, but may be made of a high heat-resistant material instead. The outer frame 141 is preferably made of a material with a low melting point.

The seventh embodiment is applicable to the CCD support mechanisms according to the two to fifth embodiments. The FPC unit may be insert-molded in the inner frame 65, in addition to the outer frame 141.

[Eighth Embodiment]

In a CCD support mechanism 160 according to an eighth embodiment, as shown in FIG. 17, a CCD shifter structure 166 has an inner frame section 161, an outer frame section 162, a base section 163, a pair of horizontal leaf spring sections 164 and a pair of vertical leaf spring sections 165 that are formed integrally with one another. In the CCD shifter structure 166, FPC units 167 and 168 having the same structure as those of the seventh embodiment are insert-molded as wiring. Each of the FPC units 167 and 168 is routed from the inner frame section 161, through the horizontal leaf spring section 164, the outer frame section 162 and the vertical leaf spring section 165, to the base section 163. One end of each of the FPC units 167 and 168 is connected to an FPC 171 disposed on a rear face of the inner frame section 161. The other ends of the FPC units 167 and 168 are connected to FPCs 169 and 170 projected upwardly from the base section 163, respectively.

[Ninth Embodiment]

The FPC is used as wiring in the foregoing embodiments, but the FPC is not always necessary for wiring. A ninth embodiment, in which the FPC is not used for wiring, will be hereinafter described. The same reference numbers as the first embodiment indicate substantially the same elements or parts, and description thereof will be omitted.

Figure 18:
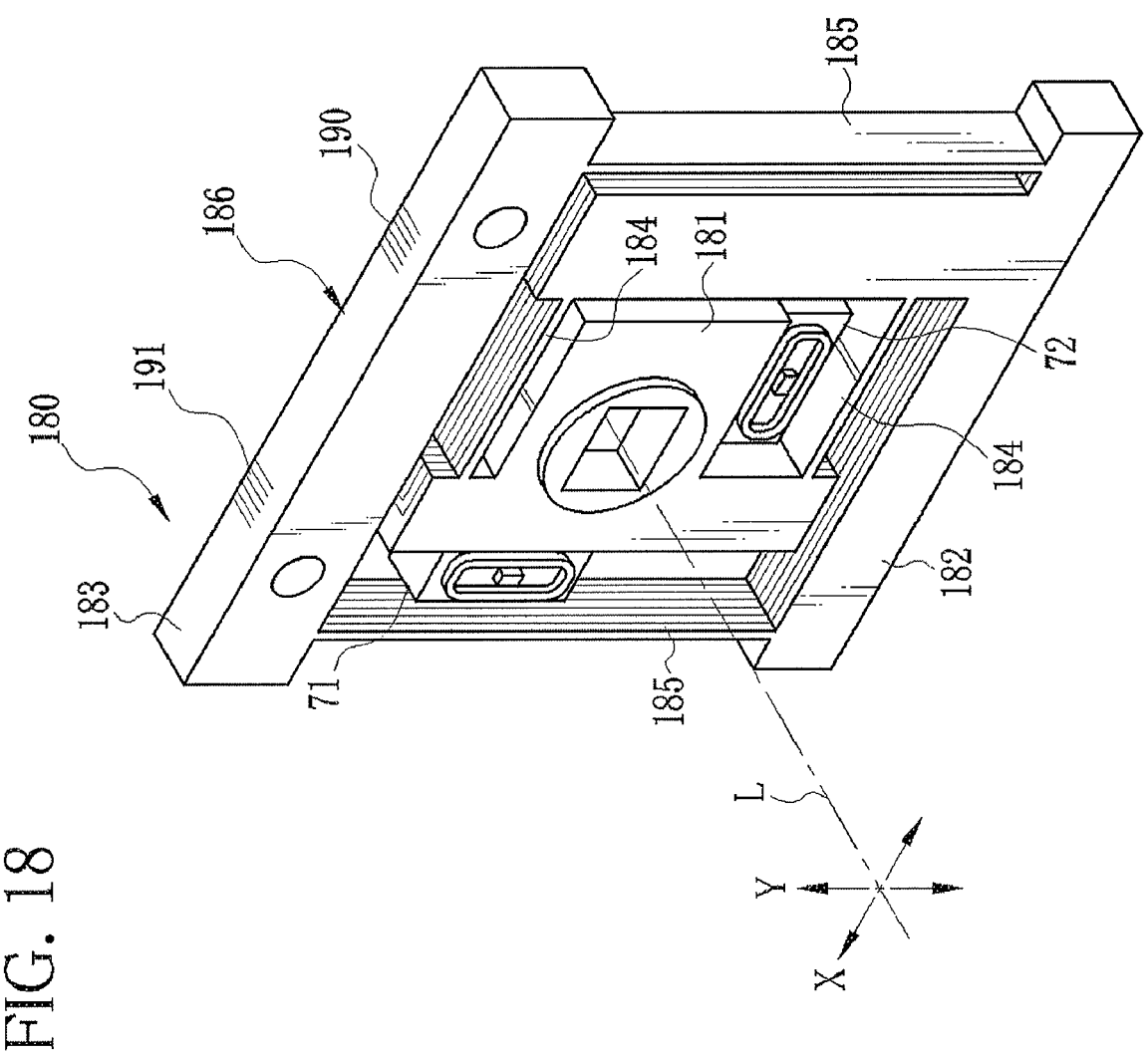
FIG. 18 is a front perspective view of a CCD support mechanism according to a ninth embodiment.

In a CCD support mechanism 180 shown in FIG. 18, a CCD shifter structure 186 has an inner frame section 181, an outer frame section 182, a base section 183, a pair of horizontal leaf spring sections 184 and a pair of vertical leaf spring sections 185 that are integrally made of plastic. The inner frame section 181, the outer frame section 182, the base section 183, the horizontal leaf spring sections 184 and the vertical leaf spring sections 185 correspond to the inner frame 65, the outer frame 66, the base block 67, the horizontal leaf springs 68 and the vertical leaf springs 69 according to the first embodiment, respectively.

Figure 19:
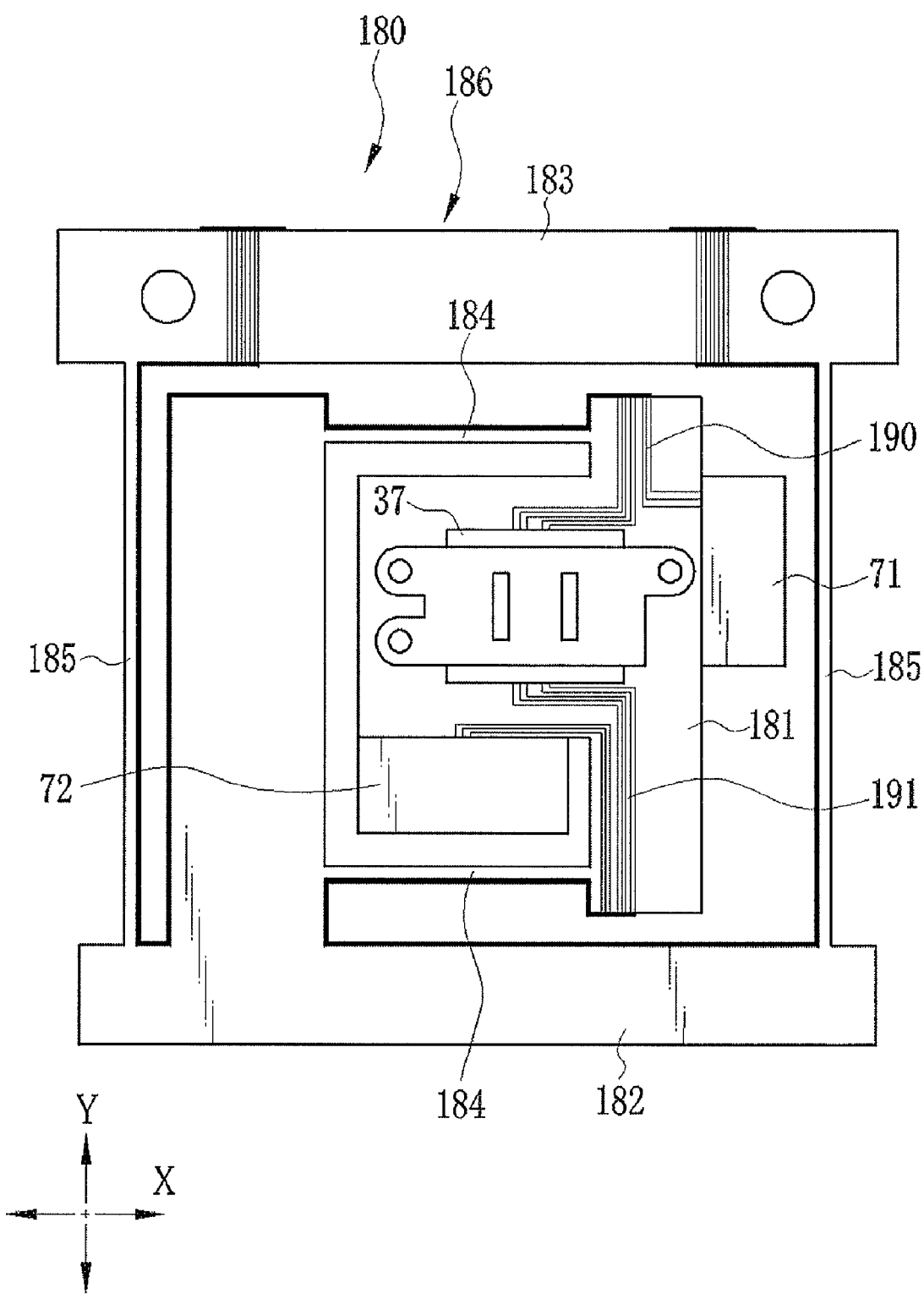
FIG. 19 is a rearview of the CCD support mechanism according to the ninth embodiment.

As shown in FIG. 19, on the CCD support mechanism 180, there are formed a first surface wiring 190 connected to the CCD 37 and the first coil unit 71 and a second surface wiring 191 connected to the CCD 37 and the second coil unit 72.

The first surface wiring 190 is routed from rear and top faces of the inner frame section 181, through a top face of the upper horizontal leaf spring section 184, top and side faces of an erected section of the outer frame section 182, a side face of the vertical leaf spring section 185 on a negative X-axis side and bottom and rear faces of the base section 183, to a top face of the base section 183. The second surface wiring 191 is routed from the rear and bottom faces of the inner frame section 181, through a bottom face of the lower horizontal leaf spring section 184, a side face of the erected section of the outer frame 182, a top face of a horizontal section of the outer frame 182, a side face of the vertical leaf spring section 185 on a positive X-axis side and the bottom and rear faces of the base section 183, to the top face of the base section 183.

The first surface wiring 190 and the second surface wiring 191 are connected at the top face of the base section 183 to a main circuit board via an FPC or the like. To insulate the first surface wiring 190 and the second surface wiring 191, insulating sheets may be glued thereon. According to the ninth embodiment, not using the FPC allows downsizing of the CCD support mechanism and the digital still camera.

The vertical leaf springs hold the horizontal leaf springs in the first to ninth embodiments, but the horizontal leaf springs may hold the vertical leaf springs instead. The image stabilizer of the present invention is applicable to various types of optical instruments including a silver halide camera and a telescope, in addition to the digital still camera.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image stabilizer used in an optical instrument comprising:
   a base block fixed to the optical instrument;
   an inner frame for holding an optical element disposed on an optical axis of the optical instrument;
   an outer frame disposed outside the inner frame;
   a pair of first leaf springs disposed in parallel with each other and elastically deformable in a first direction in a plane orthogonal to the optical axis, each of the first leaf springs being fixed to the inner frame at an end and to the outer frame at the other end;

a pair of second leaf springs disposed in parallel with each other and elastically deformable in a second direction transverse to the first direction in the plane orthogonal to the optical axis, each of the second leaf springs being fixed to the outer frame at an end and to the base block at the other end;

an actuator for shifting the inner frame or the outer frame while bending the first leaf springs or the second leaf springs, so that the optical element is shifted to counteract a shake in the first direction or the second direction; and a flexible printed circuit disposed along at least one of the first leaf springs and at least one of the second leaf springs, for being bent together with the first leaf springs and the second leaf springs.

2. The image stabilizer according to claim 1, wherein the optical element is an image sensor, and the flexible printed circuit is connected to the actuator and the image sensor.

3. The image stabilizer according to claim 1, wherein the flexible printed circuit has a first leading section and a second leading section, the first leading section is routed from the inner frame, through one of the first leaf springs, the outer frame and one of the second leaf springs, to the base block, and the second leading section is routed from the inner frame, through the other one of the first leaf springs, the outer frame and the other one of the second leaf springs, to the base block.

4. The image stabilizer according to claim 1, wherein the flexible printed circuit is disposed along one of the first leaf springs and one of the second leaf springs, the other one of the first leaf springs without the flexible printed circuit has such a thickness or a width as to have a substantially equal spring constant to the first leaf spring with the flexible printed circuit, and the other one of the second leaf springs without the flexible printed circuit has such a thickness or a width as to have a substantially equal spring constant to the second leaf spring with the flexible printed circuit.

5. The image stabilizer according to claim 1, wherein the flexible printed circuit is provided with a first leaf spring section instead of at least one of the first leaf springs, and a second leaf spring section instead of at least one of the second leaf springs.

6. The image stabilizer according to claim 5, wherein in the first leaf spring section and the second leaf spring section, an elastic reinforcement is attached to the flexible printed circuit.

7. The image stabilizer according to claim 5, wherein in the first leaf spring section and the second leaf spring section, the flexible printed circuit is folded for reinforcement.

8. The image stabilizer according to claim 5, wherein if the flexible printed circuit has the single first leaf spring section instead of one of the first leaf springs and the single second leaf spring section instead of one of the second leaf springs, the other one of the first leaf springs has such a thickness or a width as to have a substantially equal spring constant to the first leaf spring section, and the other one of the second leaf springs has such a thickness or a width as to have a substantially equal spring constant to the second leaf spring section.

9. The image stabilizer according to claim 1, wherein the flexible printed circuit is divided into at least two segments among a first segment disposed on a rear face of the inner frame, a second segment routed from the inner frame through the first leaf spring to the outer frame, a third segment routed from the outer frame through the second leaf spring to the base block, and a fourth segment disposed on a top face of the base block, and a wiring section provided in at least one of the inner frame, the outer frame, and the base block connects the first segment to the second segment, the second segment to the third segment, and the third segment to the fourth segment.

10. The image stabilizer according to claim 9, wherein the wiring section has a surface wiring.

11. The image stabilizer according to claim 9, wherein the wiring section has a flexible printed circuit unit that is insert-molded in the inner frame, the outer frame, or the base block.

12. An image stabilizer used in an optical instrument comprising:

an optical element shifter structure including the following (A) to (E);
  (A) a base block section fixed to the optical instrument;
  (B) an inner frame section for holding an optical element disposed on an optical axis of the optical instrument;
  (C) an outer frame section disposed outside the inner frame section;
  (D) a pair of first leaf spring sections disposed in parallel with each other and elastically deformable in a first direction in a plane orthogonal to the optical axis, each of the first leaf spring sections being fixed to the inner frame section at an end and to the outer frame section at the other end;
  (E) a pair of second leaf spring sections disposed in parallel with each other and elastically deformable in a second direction transverse to the first direction in the plane orthogonal to the optical axis, each of the second leaf spring sections being fixed to the outer frame section at an end and to the base block section at the other end;

an actuator disposed in the inner frame section, for shifting the inner frame section or the outer frame section while bending the first leaf spring sections or the second leaf spring sections, so that the optical element is shifted to counteract a shake in the first direction or the second direction; and a wiring section electrically connected to the actuator, and routed from the inner frame section, through at least one of the first leaf spring sections, the outer frame section, and at least one of the second leaf spring sections, to the base block section.

13. The image stabilizer according to claim 12, wherein the optical element is an image sensor or a shake correction lens.

14. The image stabilizer according to claim 12, wherein the wiring section has a flexible printed circuit that is insert-molded in the optical element shifter structure.

15. The image stabilizer according to claim 12, wherein the wiring section has a surface wiring formed on a surface of the optical element shifter structure.

16. An optical instrument having an image stabilizer, wherein the image stabilizer comprises:

a base block fixed to the optical instrument;
an inner frame for holding an optical element disposed on an optical axis of the optical instrument;
an outer frame disposed outside the inner frame;
a pair of first leaf springs disposed in parallel with each other and elastically deformable in a first direction in a plane orthogonal to the optical axis, each of the first leaf springs being fixed to the inner frame at an end and to the outer frame at the other end;
a pair of second leaf springs disposed in parallel with each other and elastically deformable in a second direction transverse to the first direction in the plane orthogonal to the optical axis, each of the second leaf springs being fixed to the outer frame at an end and to the base block at the other end;

an actuator for shifting the inner frame or the outer frame while bending the first leaf springs or the second leaf springs, so that the optical element is shifted to counteract a shake in the first direction or the second direction; and a flexible printed circuit disposed along at least one of the first leaf springs and at least one of the second leaf springs, for being bent together with the first leaf springs and the second leaf springs.

* * * * *